US012686175B2

(12) United States Patent
Gregg et al.

(10) Patent No.: US 12,686,175 B2
(45) Date of Patent: Jul. 21, 2026

(54) METHOD OF PRINTING A MULTI-MATERIAL 3D PART AND PURGE TOWER

(71) Applicant: Stratasys, Inc., Minnetonka, MN (US)

(72) Inventors: Aaron Daniel Gregg, Bloomington, MN (US); Keith Wade Kooiman, Chaska, MN (US); Karl Anthony Nelson, Minneapolis, MN (US); Paul Joseph Leavitt, Minneapolis, MN (US); Thomas James Studanski, Plymouth, MN (US); Subramaniam Jayanti, Eden Prairie, MN (US)

(73) Assignee: STRATASYS, INC., Minnetonka, MN (US)

( * ) Notice: Subject to any disclaimer, the term of this patent is extended or adjusted under 35 U.S.C. 154(b) by 322 days.

(21) Appl. No.: 18/462,783

(22) Filed: Sep. 7, 2023

(65) Prior Publication Data

US 2024/0083117 A1 Mar. 14, 2024

Related U.S. Application Data

(60) Provisional application No. 63/404,924, filed on Sep. 8, 2022.

(51) Int. Cl.
B29C 64/386 (2017.01)
B29C 64/118 (2017.01)
(Continued)

(52) U.S. Cl.
CPC .......... B29C 64/386 (2017.08); B29C 64/118 (2017.08); B29C 64/336 (2017.08);
(Continued)

(58) Field of Classification Search
CPC .............................. B29C 64/35; B29C 64/336
See application file for complete search history.

(56) References Cited

U.S. PATENT DOCUMENTS 4,876,506 A 10/1989 Brown et al.
5,049,898 A 9/1991 Arthur
(Continued)

FOREIGN PATENT DOCUMENTS

CA 3 013 502 A1 8/2017
CA 3 042 670 A1 11/2019
(Continued)

OTHER PUBLICATIONS

Humphrey, Josh, "How to Create a Custom 3D Printed Tool for FDM 3D Printers" available @ <https://www.cati.com/blog/need-a-custom-tool-make-it-a-3d-printing-tech-tip/>, Oct. 18, 2019 (Year: 2019).*
(Continued)

*Primary Examiner* — Xiao S Zhao
*Assistant Examiner* — Nicholas J Chidiac
(74) *Attorney, Agent, or Firm* — Westman, Champlin & Koehler, P ..A.

(57) ABSTRACT

A method of printing a multi-material part in a layer-wise manner with an extrusion-based 3D printer includes providing a sliced digital model of a multi-material part and determining a number of materials in each of the slices of the digital mode. The method includes utilizing a digital model of a purge tower having N subdivisions having a closed geometry, wherein N is the number of print heads needed to print the part that is greater than or equal to three, each adjacent subdivision contact one another along an interface and assigning each print head to one subdivision and to tool paths forming the one subdivision in each layer. The method includes reassigning the assigned subdivision within the (Continued)

purge tower of an inactive print head in a layer to a print head that is active in the layer of the multi-material part.

20 Claims, 16 Drawing Sheets

(51) Int. Cl.

| | |
|---|---|
| *B29C 64/336* | (2017.01) |
| *B29C 64/35* | (2017.01) |
| *B33Y 10/00* | (2015.01) |
| *B33Y 40/00* | (2020.01) |
| *B33Y 50/00* | (2015.01) |

(52) U.S. Cl.
CPC .............. *B29C 64/35* (2017.08); *B33Y 10/00* (2014.12); *B33Y 40/00* (2014.12); *B33Y 50/00* (2014.12)

(56) References Cited

U.S. PATENT DOCUMENTS

| | | | |
|---|---|---|---|
| 5,121,329 A | 6/1992 | Crump | |
| 5,169,081 A | 12/1992 | Goedderz | |
| 5,303,141 A | 4/1994 | Batchelder et al. | |
| 5,312,224 A | 5/1994 | Batchelder et al. | |
| 5,339,031 A | 8/1994 | Chern | |
| 5,340,433 A | 8/1994 | Crump | |
| 5,503,785 A | 4/1996 | Crump et al. | |
| 5,738,817 A | 4/1998 | Danforth et al. | |
| 5,764,521 A | 6/1998 | Batchelder et al. | |
| 5,866,058 A | 2/1999 | Batchelder et al. | |
| 5,900,207 A | 5/1999 | Danforth et al. | |
| 5,939,008 A | 8/1999 | Comb et al. | |
| 5,968,561 A | 10/1999 | Batchelder et al. | |
| 6,004,124 A | 12/1999 | Swanson et al. | |
| 6,022,207 A | 2/2000 | Dahlin et al. | |
| 6,054,077 A | 4/2000 | Comb et al. | |
| 6,067,480 A | 5/2000 | Stuffle et al. | |
| 6,070,107 A | 5/2000 | Lombardi et al. | |
| 6,085,957 A | 7/2000 | Zinniel et al. | |
| 6,129,872 A | 10/2000 | Jang | |
| 6,228,923 B1 | 5/2001 | Lombardi et al. | |
| 6,257,517 B1 | 7/2001 | Babish et al. | |
| 6,547,995 B1 | 4/2003 | Comb | |
| 6,645,412 B2 | 11/2003 | Priedeman, Jr. | |
| 6,685,866 B2 | 2/2004 | Swanson et al. | |
| 6,722,872 B1 | 4/2004 | Swanson et al. | |
| 6,730,252 B1 | 5/2004 | Teoh et al. | |
| 6,749,414 B1 | 6/2004 | Hanson et al. | |
| 6,790,403 B1 | 9/2004 | Priedeman, Jr. et al. | |
| 6,814,907 B1 | 11/2004 | Comb | |
| 6,869,559 B2 | 3/2005 | Hopkins | |
| 6,923,634 B2 | 8/2005 | Swanson et al. | |
| 6,976,627 B1 | 12/2005 | Culp et al. | |
| 6,998,087 B1 | 2/2006 | Hanson et al. | |
| 7,122,246 B2 | 10/2006 | Comb et al. | |
| 7,127,309 B2 | 10/2006 | Dunn et al. | |
| 7,172,715 B2 | 2/2007 | Swanson et al. | |
| 7,236,166 B2 | 6/2007 | Zinniel et al. | |
| 7,261,533 B2 | 8/2007 | Wrosz et al. | |
| 7,297,304 B2 | 11/2007 | Swanson et al. | |
| 7,306,152 B2 | 12/2007 | Culp et al. | |
| 7,384,255 B2 | 6/2008 | LaBossiere et al. | |
| 7,481,647 B2 | 1/2009 | Sambu et al. | |
| 7,572,121 B2 | 8/2009 | Wrosz et al. | |
| 7,604,470 B2 | 10/2009 | LaBossiere et al. | |
| 7,625,198 B2 | 12/2009 | Lipson et al. | |
| 7,625,200 B2 | 12/2009 | Leavitt | |
| 7,744,364 B2 | 6/2010 | Turley et al. | |
| 7,896,209 B2 | 3/2011 | Batchelder et al. | |
| 7,917,243 B2 | 3/2011 | Kozlak et al. | |
| 7,938,351 B2 | 5/2011 | Taatjes et al. | |
| 7,938,356 B2 | 5/2011 | Taatjes et al. | |
| 7,939,003 B2 | 5/2011 | Bonassar et al. | |
| 8,033,811 B2 | 10/2011 | Swanson et al. | |
| 8,070,473 B2 | 12/2011 | Kozlak | |
| 8,075,300 B2 | 12/2011 | Zinniel | |
| 8,153,182 B2 | 4/2012 | Comb et al. | |
| 8,221,669 B2 | 7/2012 | Batchelder et al. | |
| 8,226,395 B2 | 7/2012 | Pax et al. | |
| 8,282,380 B2 | 10/2012 | Pax et al. | |
| 8,287,794 B2 | 10/2012 | Pax et al. | |
| 8,926,484 B1 | 1/2015 | Comb et al. | |
| 8,955,558 B2 | 2/2015 | Bosveld et al. | |
| 9,108,360 B2 | 8/2015 | Comb et al. | |
| 9,238,329 B2 | 1/2016 | Swanson et al. | |
| 9,421,713 B2* | 8/2016 | Swanson ............... | B29C 64/393 |
| 9,427,838 B2 | 8/2016 | Comb et al. | |
| 9,469,072 B2 | 10/2016 | Schmehl et al. | |
| 9,481,132 B2 | 11/2016 | Schmehl et al. | |
| 10,214,004 B2 | 2/2019 | Schmehl et al. | |
| 10,217,005 B2 | 2/2019 | Liu et al. | |
| 10,562,289 B2 | 2/2020 | Skubic et al. | |
| 11,584,088 B2 | 2/2023 | Yamazaki | |
| 11,760,015 B2 | 9/2023 | Leavitt et al. | |
| 2002/0062909 A1 | 5/2002 | Jang et al. | |
| 2005/0129941 A1 | 6/2005 | Comb et al. | |
| 2006/0156978 A1 | 7/2006 | Lipson et al. | |
| 2006/0160250 A1 | 7/2006 | Bonassar et al. | |
| 2007/0003656 A1 | 1/2007 | LaBossiere et al. | |
| 2007/0228590 A1 | 10/2007 | LaBossiere et al. | |
| 2009/0035405 A1 | 2/2009 | Leavitt | |
| 2009/0173443 A1 | 7/2009 | Kozlak et al. | |
| 2009/0263582 A1 | 10/2009 | Batchelder | |
| 2009/0273122 A1 | 11/2009 | Batchelder et al. | |
| 2009/0274540 A1 | 11/2009 | Batchelder et al. | |
| 2010/0096072 A1 | 4/2010 | Hopkins et al. | |
| 2010/0096485 A1 | 4/2010 | Taatjes et al. | |
| 2010/0096489 A1 | 4/2010 | Taatjes et al. | |
| 2010/0100224 A1 | 4/2010 | Comb et al. | |
| 2010/0283172 A1 | 11/2010 | Swanson | |
| 2010/0327479 A1 | 12/2010 | Zinniel et al. | |
| 2011/0074065 A1 | 3/2011 | Batchelder et al. | |
| 2011/0076495 A1 | 3/2011 | Batchelder et al. | |
| 2011/0076496 A1 | 3/2011 | Batchelder et al. | |
| 2011/0117268 A1 | 5/2011 | Batchelder et al. | |
| 2011/0121476 A1 | 5/2011 | Batchelder et al. | |
| 2011/0186081 A1 | 8/2011 | Dunn et al. | |
| 2011/0233804 A1 | 9/2011 | Batchelder et al. | |
| 2011/0241947 A1 | 10/2011 | Scott et al. | |
| 2012/0067501 A1 | 3/2012 | Lyons | |
| 2012/0068378 A1 | 3/2012 | Swanson et al. | |
| 2012/0070523 A1 | 3/2012 | Swanson et al. | |
| 2012/0162314 A1 | 6/2012 | Swanson et al. | |
| 2012/0164256 A1 | 6/2012 | Swanson et al. | |
| 2012/0258250 A1 | 10/2012 | Rodgers | |
| 2012/0304449 A1 | 12/2012 | Jackson et al. | |
| 2013/0075957 A1 | 3/2013 | Swanson et al. | |
| 2013/0078073 A1 | 3/2013 | Comb et al. | |
| 2013/0333798 A1 | 12/2013 | Bosveld et al. | |
| 2014/0252684 A1* | 9/2014 | Swanson ............... | B29C 64/393 264/401 |
| 2015/0093588 A1 | 4/2015 | Sadusk et al. | |
| 2015/0137401 A1 | 5/2015 | Comb et al. | |
| 2015/0190966 A1 | 7/2015 | Griszbacher et al. | |
| 2015/0273582 A1 | 10/2015 | Crump et al. | |
| 2015/0375453 A1 | 12/2015 | Yost et al. | |
| 2016/0136893 A1 | 5/2016 | Chang et al. | |
| 2016/0136894 A1 | 5/2016 | Din et al. | |
| 2017/0050383 A1 | 2/2017 | Bell et al. | |
| 2017/0057173 A1 | 3/2017 | van der Zalm | |
| 2017/0064840 A1 | 3/2017 | Espalin et al. | |
| 2017/0120522 A1 | 5/2017 | Skubic et al. | |
| 2017/0297320 A1 | 10/2017 | Swanson | |
| 2018/0015655 A1 | 1/2018 | Gheorghescu et al. | |
| 2018/0194056 A1 | 7/2018 | van der Zalm | |
| 2019/0322048 A1 | 10/2019 | Huitema et al. | |
| 2020/0171811 A1 | 6/2020 | Bell et al. | |
| 2020/0269506 A1 | 8/2020 | Macmullen et al. | |
| 2020/0282659 A1 | 9/2020 | Lan et al. | |
| 2020/0406547 A1 | 12/2020 | Yuwaki | |
| 2021/0046709 A1 | 2/2021 | Barbolini | |
| 2021/0107160 A1 | 4/2021 | Kokubo | |

(56) References Cited

U.S. PATENT DOCUMENTS

| | | |
|---|---|---|
| 2021/0197285 A1 | 7/2021 | Schodin et al. |
| 2022/0057771 A1 | 2/2022 | Beffrey et al. |
| 2022/0396033 A1 | 12/2022 | Liu |
| 2022/0410273 A1 | 12/2022 | Price |
| 2023/0028236 A1 | 1/2023 | Leavitt et al. |
| 2023/0064999 A1 | 3/2023 | Yamazaki |
| 2023/0202112 A1 | 6/2023 | Bosveld et al. |
| 2023/0211553 A1 | 7/2023 | Leavitt et al. |
| 2023/0211556 A1 | 7/2023 | Leavitt et al. |
| 2023/0243672 A1 | 8/2023 | Bosveld et al. |

FOREIGN PATENT DOCUMENTS

| | | |
|---|---|---|
| CN | 112 497 746 A | 3/2021 |
| EP | 2 655 046 A1 | 10/2013 |
| EP | 3 495 144 A1 | 6/2019 |
| EP | 3865879 A1 | 8/2021 |
| FR | 3 076 484 A1 | 7/2019 |
| JP | 2017159620 A | 9/2017 |
| WO | 2012070052 A1 | 5/2012 |
| WO | 2012085914 A1 | 6/2012 |
| WO | 2014137637 A1 | 9/2014 |
| WO | 2016088049 A1 | 6/2016 |
| WO | 2018038749 A1 | 3/2018 |
| WO | 2018/069720 | 4/2018 |
| WO | 2017044892 A1 | 7/2018 |
| WO | 2018069749 A1 | 7/2018 |
| WO | 2018069750 A1 | 7/2018 |
| WO | 2020030964 A1 | 2/2020 |
| WO | 2020237166 A2 | 11/2020 |
| WO | 2022/232248 | 11/2022 |
| WO | 2023/003590 | 1/2023 |
| WO | 2023/129333 | 7/2023 |

OTHER PUBLICATIONS

Mihai-Stanimir, "Wipe tower requires a minimum of filament purge and this cannot be changed anywhere #8149", available @ <https://github.com/prusa3d/PrusaSlicer/issues/8149>, Apr. 1, 2022. (Year: 2022).*

First Office Action from Chinese Application Serial No. 202190001057.7 issued Jul. 24, 2024.

Communication pursuant to Rules 161(1) and 162 EPC from European Patent Application No. 22846976.3, dated Aug. 6, 2024.

Communication pursuant to Rules 161(1) and 162 EPC from European Application No. 21848479.8, dated Mar. 1, 2024.

International Search Report and Written Opinion mailed May 4, 2022 for PCT/US2021/065693 filed Dec. 30, 2021.

International Search Report and Written Opinion mailed Mar. 27, 2023 for PCT/US2022/051617 filed Dec. 2, 2022.

Anonymous: "The first printer to automatically correct its geometry in all axes (Update: New Video)—Prusa Printers", Sep. 21, 2016 (Sep. 21, 2016), XP055731490, Retrieved from the Internet: https://blog.prusaprinters.org/first-printer-to-automatically-correct-geometry-in-all-axes_4451/[retrieved on Jun. 17, 2020] pp. 1-6.

Schouten Martijn et al.: "Inductive XY calibration method for multi-material fused filament fabrication 3D printers", Additive Manufacturing, [Online] vol. 56, May 23, 2022 (May 23, 2022), p. 102890, XP093031692, NL ISSN: 2214-8064, DOI: 10.1016/j.addma.2022.102890 Retrieved from the Internet: https://ris.utwente.nl/ws/portalfiles/portal/282087575/1_s2 .0_S2214860422002883_main.pdf [retrieved on Mar. 14, 2023] pp. 1-2.

Davies, Sam "Titan Robotics launch The Cronus 3D printer with five print heads" 2017 CES 3D Printing Marketplace sponsored by TCT, Jan. 9, 2017, https://www.tctmagazine.com/3d-printing-at-ces/titan-robotics-launch-the-cronus-3d-printer-five-print-heads/.

Parker, Michael "Close Up of Titan Robotics' Cronus at RAPID +tct 2017" Youtube, uploaded by Michael Parker, May 11, 2017, https://www.youtube.com/watch?v=XOgC30zDTYc.

US Prosecution History from U.S. Appl. No. 17/566,081, filed Dec. 30, 2021 including: Non-Final Rejection mailed Mar. 10, 2023, Notice of Allowance and Fee(s) due mailed Jul. 6, 2023, Corrected Notice of Allowability mailed Jul. 24, 2023; and Supplemental Notice of Allowability mailed Aug. 9, 2023.

International Search Report and Written Opinion mailed Jun. 25, 2014 for PCT/US2014/017915 filed Feb. 24, 2014.

U.S. Patent Office issued prosecution for U.S. Appl. No. 17/562,377, filed Dec. 27, 2021, including: Notice of Allowance and Fees Due (PTOL-85) and Examiner Initiated Interview Summary issued Nov. 16, 2023, 11 pages; Restriction Requirement issued Jul. 27, 2023, 6 pages; 17 pages total.

Office Action from U.S. Appl. No. 13/790,924, dated Oct. 13, 2015.

Office Action from Japanese Application Serial No. 2024-600016, issued Jun. 11, 2024.

* cited by examiner

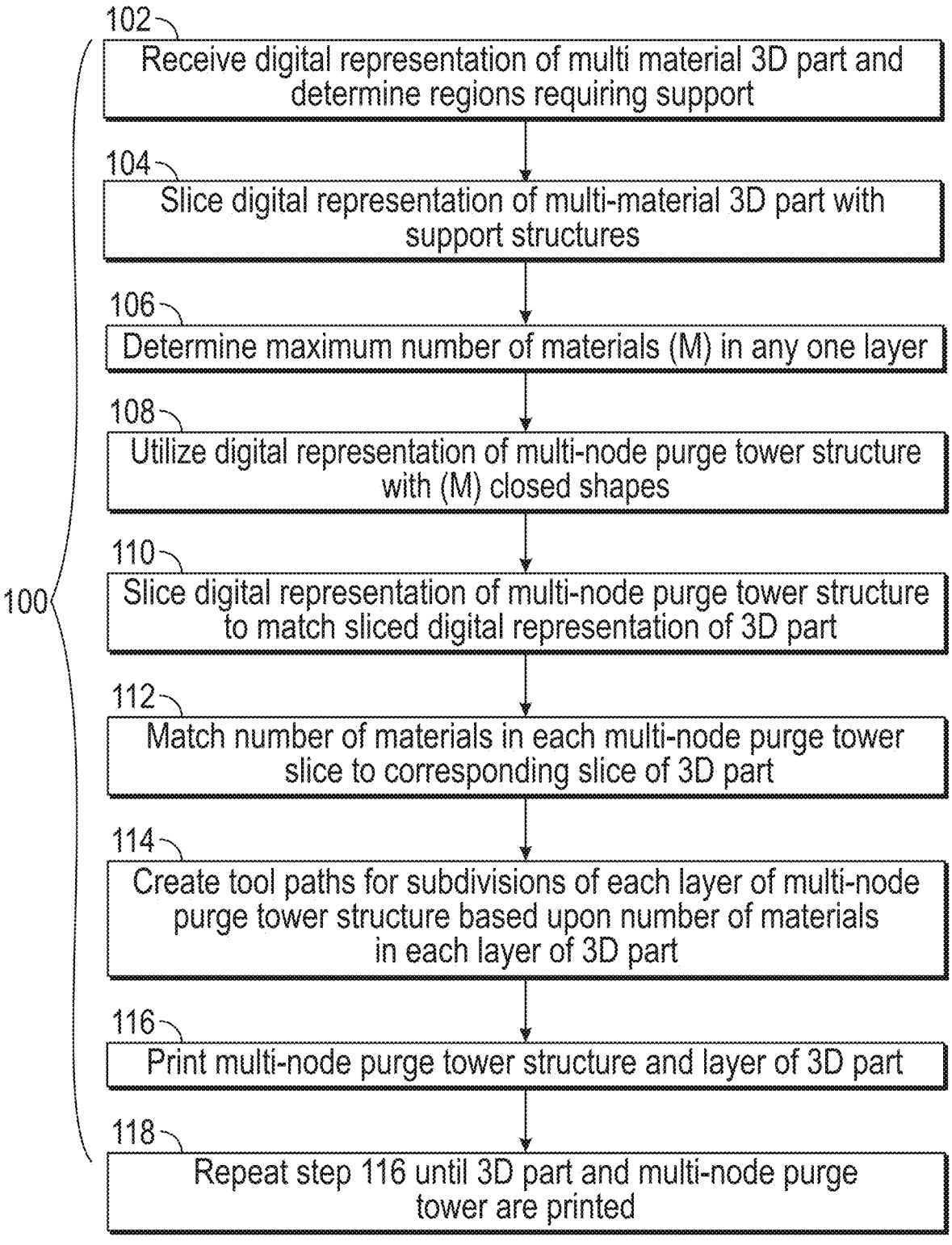

102 — Receive digital representation of multi material 3D part and determine regions requiring support 104 — Slice digital representation of multi-material 3D part with support structures 106 — Determine maximum number of materials (M) in any one layer 108 — Utilize digital representation of multi-node purge tower structure with (M) closed shapes 110 — Slice digital representation of multi-node purge tower structure to match sliced digital representation of 3D part 112 — Match number of materials in each multi-node purge tower slice to corresponding slice of 3D part 114 — Create tool paths for subdivisions of each layer of multi-node purge tower structure based upon number of materials in each layer of 3D part 116 — Print multi-node purge tower structure and layer of 3D part 118 — Repeat step 116 until 3D part and multi-node purge tower are printed

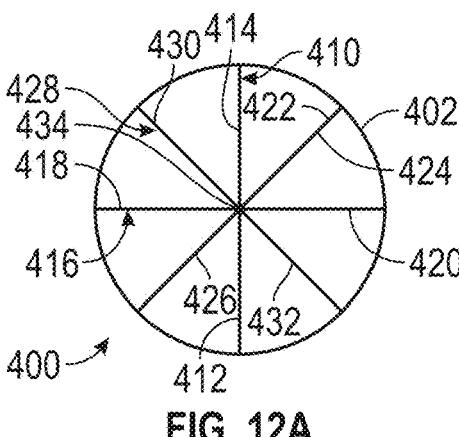
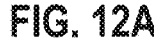
FIG. 12A
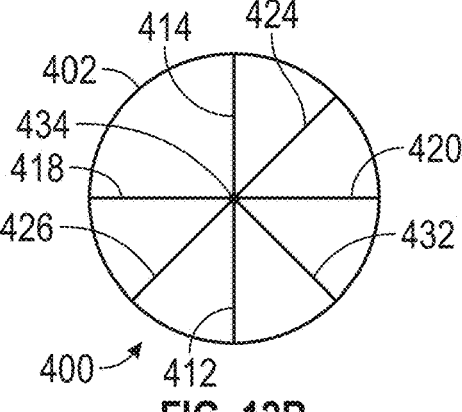
FIG. 12B
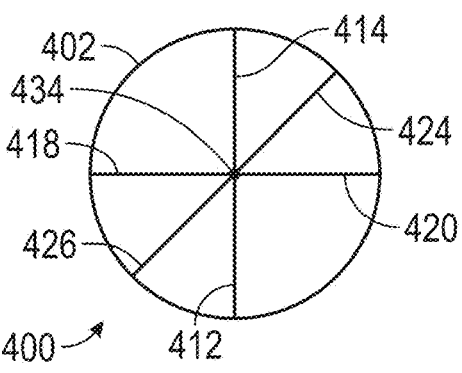
FIG. 12C
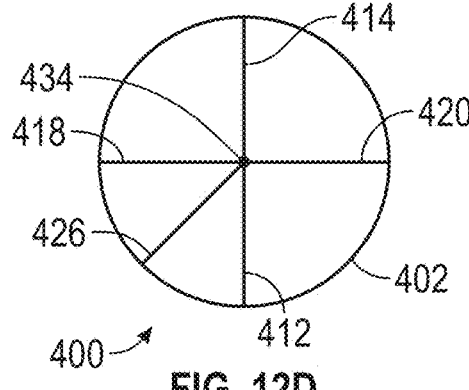
FIG. 12D
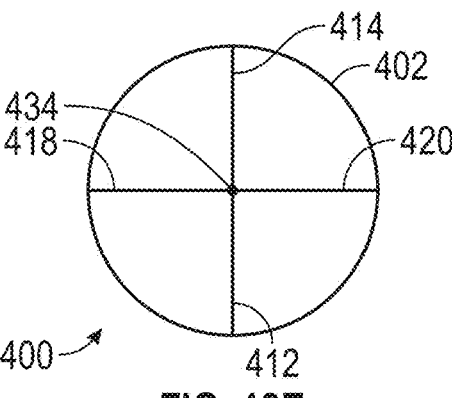
FIG. 12E
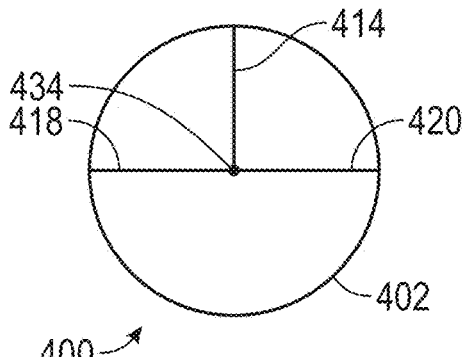
FIG. 12F
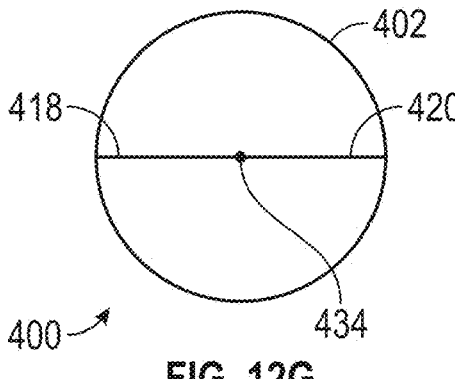
FIG. 12G
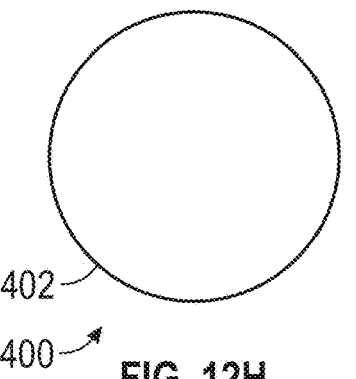
FIG. 12H

METHOD OF PRINTING A MULTI-MATERIAL 3D PART AND PURGE TOWER

CROSS-REFERENCE TO RELATED APPLICATION

The present application is based on and claims the benefit of U.S. provisional patent application Ser. No. 63/404,924, filed Sep. 8, 2022, the content of which is hereby incorporated by reference in its entirety.

BACKGROUND

The present disclosure relates to additive manufacturing systems for 3D printing of parts by material extrusion techniques. In particular, the present disclosure relates to a method of printing a multi-material part. All references disclosed herein are incorporated by reference.

Additive manufacturing, also called 3D printing, is generally a process in which a three-dimensional (3D) part is built by adding material to form a 3D part rather than subtracting material as in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, MN), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

To print a support structure and a model, the additive manufacturing system may utilize a plurality of print heads, where a first print head may be used to print the 3D part, and a second material print head may be used to print the support structure. When printing with a plurality of print heads (or multiple deposition lines), each print head is preferably switchable between an "operating mode" and a "stand-by mode". The operating mode is preferably a mode in which a liquefier assembly of the print head to be heated to its set point operating temperature(s) to generate a desired thermal gradient for melting the part or support material. In comparison, the stand-by mode is preferably a mode in which the liquefier assembly of the print head is cooled down from its operating mode to prevent its part or support material from thermally degrading, oozing or dripping out. Typically, when the when one print part print head is in its operating mode to print a layer of the 3D part, the other part print heads and the support print head are its stand-by mode, and vice versa. For example, after a 3D part layer is completed, the additive manufacturing system may then switch the print heads such that the support print head is brought to its operating mode to print a layer of the support structure, and the part print heads are brought to its stand-by mode. Then, after the support structure layer is completed, the additive manufacturing system may switch the print heads back such that one of the part print heads is brought to its operating mode to print a layer or a portion of a layer of the part, and the support print head is brought to its stand-by mode.

When each print head is brought to its operating mode, it preferably undergoes a purge operation prior to printing the next layer or a portion of the next layer. This purge operation provides several desired functions. First, it frees any part or support material filament that may be adhered to the walls of the liquefier assembly, and verifies that the print head can extrude the part or support material. It also removes any entrained gases and degraded materials in the print head, and brings the print head to a known operating state for printing the subsequent layer, such as bringing a meniscus in the liquefier assembly to a substantially known position and raising the internal temperature of the liquefier assembly to a substantially steady-state condition. It also removes variable ooze that may hang from a nozzle of the liquefier assembly while the print head is idle or in its stand-by mode, and can account for variability of any voids in a tip pipe region of the nozzle. Additionally, for very low-volume-per-layer 3D parts, it may provide a minimum flow volume per layer to reduce the residence time-at-temperature for the part material.

As discussed in Turley et al., U.S. Pat. No. 7,744,364, a purge operation conventionally involves moving the given print head to a purge station, where it extrudes a strand of the part or support material into a purge bucket, optionally followed by a tip wipe operation. As an alternative to a purge station, a purge tower can be printed on the build platform alongside the part, as both are built up layer by layer, as discussed in Swanson et al., U.S. Pat. No. 9,421,713. The purge tower allows each print head to achieve the above-discussed desired functions of a purge operation without requiring the use of a separate purge station. This can increase the useable build volume in the additive manufacturing system, as well as reducing the amount of part and support materials consumed during the purge operations and allowing the additive manufacturing system to operate in a fully automated manner. Techniques disclosed in Swanson are directed to printing various types of two-material purge towers.

SUMMARY

An aspect of the present disclosure relates to a method of printing a multi-material part in a layer-wise manner with an extrusion-based 3D printer. The method includes providing a sliced digital model of a multi-material part and determining a number of materials in each of the slices of the digital model. The method includes utilizing a digital model of a purge tower having a multi-node configuration comprising N subdivisions each having a closed geometry, wherein N is the number of print heads needed to print the part and is a number greater than or equal to three, each subdivision being adjacent to at least two other subdivisions. Each print head is assigned to one subdivision and to tool paths forming the one subdivision in each layer, wherein portions of the toolpaths of adjacent subdivisions of the purge tower contact one another along an interface. For each layer of the multi-material 3D part that utilizes less the N print heads, the method includes reassigning the assigned subdivision within the purge tower of an inactive print head in a layer to a print head that is active in the layer of the multi-material 3D part. The method includes printing the subdivisions of each layer of the purge tower with the assigned or reassigned print heats to bring each print head utilized to print a portion of a layer or a layer of the multi-material part from a standby condition to a printing condition and printing portions of the layer or the layer of the multi-material 3D part with the print head in the printing condition until the multi-material part is printed.

Another aspect of the present disclosure relates to a method of printing a multi-material part in a layer-wise manner with an extrusion-based 3D printer. The method includes providing a sliced digital model of a multi-material 3D part and identifying a number of print heads (N) needed to print the part on the extrusion-based 3D printer. The method includes determining a number of materials in each of the slices of the digital model and determining the maximum number of materials (M) in a single slice, wherein M is less than or equal to N. The method includes utilizing a digital model of a purge tower having a multi-node configuration comprising M subdivisions each having a closed geometry, where each adjacent subdivision contacts one another along an interface. The method includes assigning each print head required to print the multi-material 3D part to one subdivision and to tool paths forming the one subdivision in each layer, wherein portions of the toolpaths of adjacent subdivisions of the purge tower are proximate each other. For each layer of the multi-material 3D part that utilizes less the M print heads, the method includes reassigning the assigned subdivision within the purge tower of an inactive print head in a layer to a print head that is active in the layer of the multi-material 3D part. The method includes printing the subdivisions of each layer of the purge tower with the assigned or reassigned print heats to bring each print head utilized to print a portion of a layer or a layer of the multi-material part from a standby condition to a printing condition and then printing portions of the layer or the layer of the multi-material 3D part with the print head in the operating condition in a layer-wise manner until the multi-material part is printed.

Another aspect of the present disclosure relates to a computer program product comprising non-transitory computer executable code embodied in a non-transitory computer readable medium. When executing on one or more computing devices, the program product performs the step of generating layerwise instructions for 3D printing a multi-node purge tower having a multi-subdivision configuration in coordination with 3D printing a multi-material part from three or more material extrusion print heads in a 3D printer wherein adjacent nodes have sufficient wall to wall contact along an interface to provide a stable structure which will not topple as the structure grows higher while outer purge walls are substantially straight or decreasing in cross section as a height of the purge tower increases, wherein the toolpaths of each subdivision are closed and the toolpaths do not overlap and each toolpath of each subdivision has a sufficient length such that a print head is brought from a standby condition to a printing condition and wherein the subdivisions can have different geometric configurations. The program then causes subdivisions of the layers of the multi-node purge tower to be printed using print heads required to print a corresponding layer of the multi-material part wherein the print heads are brought to a printing condition from a stand-by condition to an operating condition, and after the print heads are brought to the printing condition, causing a multi-material part to be printed in a layerwise manner wherein the multi-material part is printed from three or more materials, inclusive of support materials, which may be dissimilar material types or formulations, different colors of the same material type, different fillers in materials of the same type, combinations thereof, or the like.

Another aspect of the present disclosure relates to a computer program product comprising non-transitory computer executable code embodied in a non-transitory computer readable medium that, when executing on one or more computing devices, performs the step of generating layer-wise instructions for 3D printing a multi-node purge tower having a multi-subdivision configuration in coordination with 3D printing a multi-material part from three or more material extrusion print heads in a 3D printer wherein adjacent nodes have sufficient wall to wall contact along an interface to provide a stable structure which will not topple as the structure grows higher while outer purge walls are substantially straight or decreasing in cross section as a height of the purge tower increases, wherein the toolpaths of each subdivision is closed and the toolpaths do not overlap and each toolpath of each subdivision has a sufficient length such that a print head is brought from a standby condition to a printing condition and wherein the subdivisions can have different geometric configurations. The program product then causes subdivisions of the layers of the multi-node purge tower to be printed using print heads required to print a corresponding layer of the multi-material part wherein the print heads are brought to a printing condition from a stand-by condition to an operating condition, and after the print heads are brought to the printing condition, causing a multi-material part to be printed in a layerwise manner wherein the multi-material part is printed from three or more materials, inclusive of support materials, which may be dissimilar material types or formulations, different colors of the same material type, different fillers in materials of the same type, combinations thereof, or the like.

BRIEF DESCRIPTION OF THE DRAWINGS

FIG. 7 is a flow chart of a method of printing a multi-material 3D part and associated multi-material, multi-node purge tower.

FIGS. 12A-12H are schematic drawings of tool paths for a circle having one to eight subdivisions.

DETAILED DESCRIPTION

Figure 1:
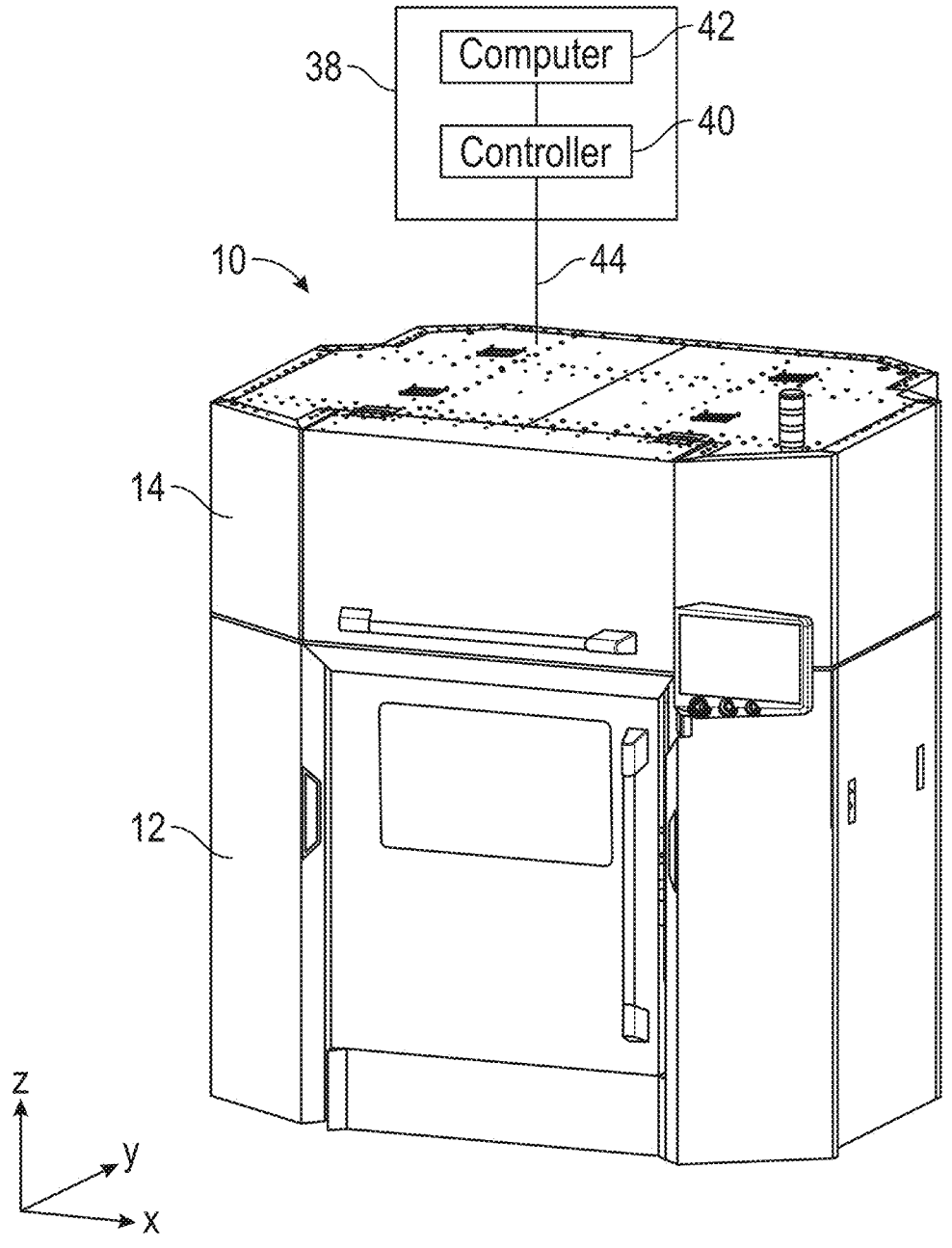
FIG. 1 is a perspective view of an extrusion-based 3D printer of the present invention having a heated build chamber positioned below a tool chamber.
Figure 2:
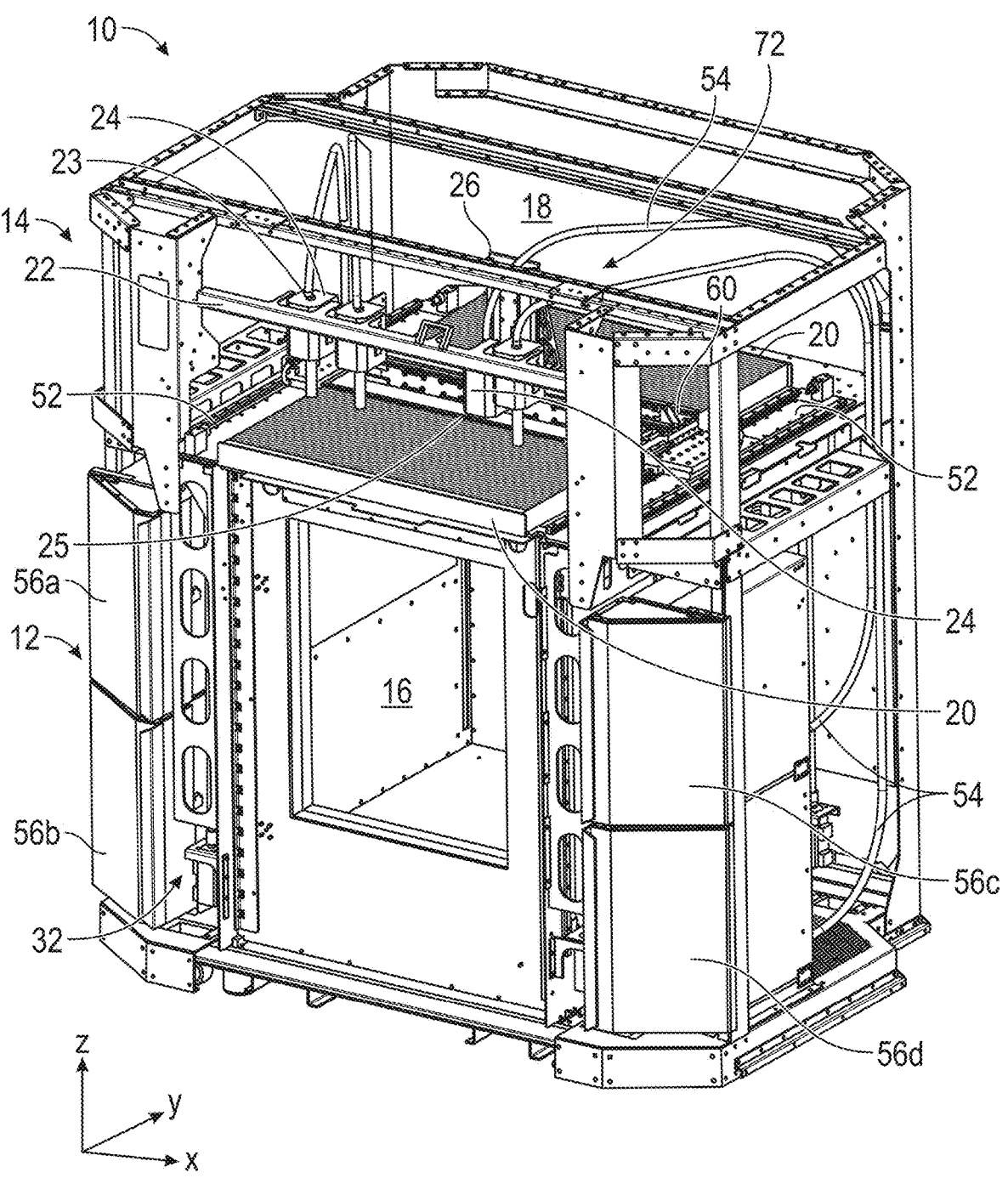
FIG. 2 is a perspective view of portions of the 3D printer shown in FIG. 1, with portions of the frame or cabinet removed.
Figure 3:
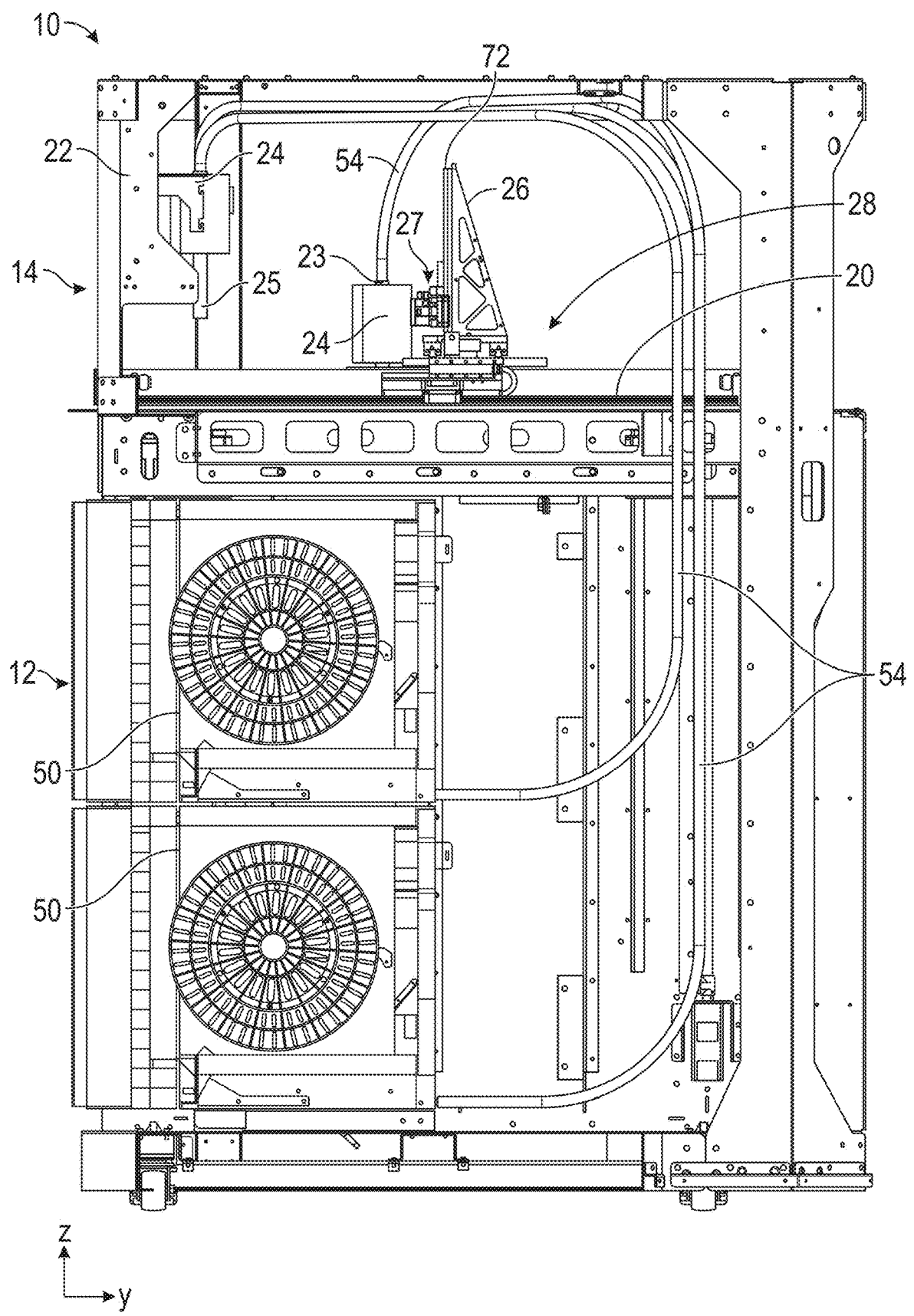
FIGS. 3-5 are views of the 3D printer shown in FIG. 1.

The present disclosure relates to a method of printing of a multi-material part and optional support structure along with a multi-material, multi-node purge tower where both the multi-material part with optional support structures and the multi-material, multi-node purge tower are printed in a layer by layer manner utilizing an extrusion-based additive manufacturing system and three or more printing materials. The multi-material, multi-node purge tower is formed of N subdivisions, where N is a number 3 or greater, and where each subdivision touches and thereby supports another subdivision for structural stability of the purge tower.

In one embodiment of the present disclosure utilizes a sliced digital representation of a 3D part to determine the number of materials utilized in each layer, whether part materials or support materials. Once the maximum number of materials (N) in a single layer is determined, a model of a multi-material, multi-node purge structure is generated or utilized and has N number of abutting subdivisions, each forming a node of the purge tower. In another embodiment of the present disclosure a multi-material, multi-node purge tower of N number of abutting subdivisions is determined based upon the N number of print heads or tools in the extrusion-based additive manufacturing system.

A "subdivision" as used herein is defined as a closed geometry or a figure consisting of cross-sections of the closed geometry, that makes up a portion of each layer of the multi-material, multi-node purge tower. Each purge tower of the present invention has three or more subdivisions, each subdivision being adjacent to at least two other subdivisions, and each subdivision has a consistent geometry throughout all layers of the purge tower. Each layer of a subdivision is printed by extruding material along a single corresponding toolpath, whose line segment and/or curves are connected where the line segments and/or curves start and end proximate the same point but do not overlap and do not require overlapping of an adjacent subdivision toolpath while printing its own subdivision toolpath; however, the same toolpath can in some cases form multiple subdivisions (as described below). Toolpaths of adjacent subdivisions touch and adhere or bond to each other within each layer to provide structural integrity to the purge tower.

As the multi-material, multi-node tower is printed in the layer by layer manner, the stacked subdivisions are either the same geometric size and shape (congruent) to form straight walls or decrease in size while maintain a similar shape to form inwardly slanted walls from the bottom to the top of the purge tower. Typically, the subdivisions to not increase in size as the multi-material, multi-node tower is printed to prevent the multi-material, multi-node tower from becoming unstable.

Each adjacent subdivision within a layer of the purge tower adheres or bonds to each other. In some embodiments, the cross-sectional geometry of the layers of the purge tower include a central point where the subdivisions conjoin where each subdivision adheres or bond to two adjacent subdivisions. In other embodiments, the cross-sectional geometry of the layers of the purge tower have adjacent subdivisions bonding to each other, where each subdivision is bonded to one or more subdivisions depending upon the geometry of the layers of the purge tower. In some embodiments, the subdivisions of the purge tower have a somewhat rounded projections and/or divisions that define the geometric shape of the layer of the purge tower.

The toolpaths for each subdivision within each layer have an enclosed geometry or shape matched to the geometry of the subdivision, and each has a starting point and an ending point proximate one another. The toolpaths for adjacent subdivisions do not pass over each other to prevent an extruder or print head from jamming or plugging or from one subdivision intruding into another subdivision. The tool paths for each of the subdivisions do not need to be congruent or similar in shape to form a layer of the tower or the tower. However, the toolpaths are typically congruent or identical for convenience with the toolpath lengths being the same or substantially the same for each subdivision within a layer of the purge tower. The toolpaths for each of the subdivisions that form the multi-material, multi-node purge tower are of a sufficient length such that a sufficient volume of material is extruded to bring the print head or tool from the stand by mode to the operating mode.

In general, each subdivision of a purge tower is uniquely matched to a print head. But, in some layers, the maximum number of print heads will not all be active, and yet the subdivisions will still need to be created. In these cases, one of the active print heads will need to accommodate for the inactive print head, by printing not only a particular subdivision, but also the subdivision normally printed by another print head. In this case, the active print head will still need to create both subdivisions, either following a single, combined toolpath, or one toolpath for each subdivision, to form the multiple subdivisions.

Once the configuration of the multi-material, multi-node purge tower structure is determined, the digital model of the multi-material, multi-node purge tower structure is sliced into layers having N subdivisions and the number of materials, whether part materials or support materials, are determined based upon each layer of the sliced digital model of the 3D part. Once the number of materials in each layer are determined, tool paths of the multi-material, multi-node purge tower structure are then generated on a layer by layer basis for each print head to be purged where the tool paths of used for each subdivision and between adjacent subdivisions do not intersect or overlap. In some embodiments, the tool paths for each subdivision includes two segments where the segments of adjacent subdivisions are aligned such that when the multi-material, multi-node purge tower is printed the segments of the adjacent subdivisions bond together to provide structural stability to the multi-material, multi-node purge tower.

To print a multi-material part and optional support structure, each print head that is used to extrude a layer or a portion of a layer is brought from the stand-by mode to the operating mode prior to printing the subdivision of the layer to ensure print quality. To bring a print head from the stand-by mode to the operating mode, the print head is heated to bring the material within a liquefier tube to a flowable state and then material is extruded from an extrusion port to print one or more subdivisions of a layer of the multi-material, multi-node purge tower structure along the generated tool paths to bring the print head to the operating mode by extruding the required volume of material. With the print head in the operating mode, a portion of a layer or a layer of the 3D part can be accurately printed. The process is repeated for each print head used to extrude each material that is required to print each layer of the 3D part and support structure such that a layer of the multi-material, multi-node purge tower structure is printed as a layer of the 3D part is printed, resulting in the last printed layer of the 3D part and the last printed layer of the multi-material, multi-node purge tower being at substantially the same height from the platen in the 3D printer.

The multi-material, multi-node purge tower structure is configured to be stable at heights equivalent to the height of the multi-material 3D part. A tall multi-material, multi-node purge tower structure typically has a larger base that tapers to a smaller top layer to aid in providing structural strength and stability as the purge tower structure is printed. The subdivisions are stack one on top of the other to form the multi-material, multi-node purge tower have geometric similarity, meaning the stacked subdivisions have the same shape and all linear dimensions have the same scale ratio. In some embodiments the stacked subdivisions also are geometrically congruent, meaning the stacked subdivisions have the same shape and size such that the multi-material, multi-node purge tower has substantially straight, vertical walls. It is within the scope of the present disclosure for the multi-material, multi-node purge tower to have both substantially straight vertical wall portions and inwardly tapered vertical wall portions when printing a single multi-material, multi-node purge tower.

The subdivisions that form the multi-material, multi-node purge tower are typically closed looped with two or more internal walls that allow the adjacent loops to bond together. In some embodiments, the starting point for the extrusion of the subdivisions and the ending point is located on a perimeter wall portion, avoiding seam placement on the adjacent portions of subdivisions. Starting and ending on the perimeter wall portion of the subdivision allows for start-up extrusion errors that does not affect the adjacent subdivisions. For instance, if the starting point were located on an adjacent wall and an extrusion error occurred, then the contact between adjacent subdivision may be negatively affected (e.g., reduced lateral adhesion between extruded toolpaths) by the start-up extrusion error of the subdivision being printed.

The multi-material, multi-node purge tower structure provides an orderly way of bringing print heads into the printing condition while maintaining a relatively small footprint on the build platen and within the print chamber. The multi-material, multi-node purge tower avoids need for including a purge bucket and purging zone in the footprint of the printer, and allows more space on the platen and volume within the chamber to be utilized to print multi-material 3D parts.

The multi-material, multi-node purge tower structure is designed such that the toolpaths of each subdivision is of sufficient length to extrude a sufficient material volume in each subdivision to bring each print head from the stand-by mode to the operating mode. Additionally, the multi-material, multi-node purge tower structure is self-supporting, meaning that no support structures are needed. However, support material can be a portion of the multi-material, multi-node purge tower structure.

The multi-material, multi-node purge tower structure and the multi-material 3D part are printed with materials and in a manner that sufficiently adheres the layers and subdivisions to each other to provide structural integrity and strength to both the multi-material 3D part and the multi-material, multi-node purge tower structure. The N subdivisions of the multi-material, multi-node purge tower structure allow for lateral adhesion between extruded paths to adhere the subdivisions together while the toolpaths in any combinations of subdivisions do not intersect. Additionally, the size of the multi-material, multi-node purge tower structure is minimized to minimize costs of materials consumed and usable build space occupied by the multi-material, multi-node purge tower structure while meeting the above constraints for the purge tower.

The software utilized to create the purge tower and assign the subdivision to a print head has the dynamic ability to meet the needs of the build pack for each layer. The software contains code that is configured to adapt to the demands of printing a multi-material part while printing a stable multi-material purge tower. The software is capable of determining the number of extruders needed to be purged from a stand-by mode to an operating mode in a layer-by-layer manner for printing the part and assigning or reassigning one or more subdivisions in the purge tower layer based upon the number of print heads required to print the layer of the part.

The present disclosure may be used with any suitable additive manufacturing system, commonly referred to as a 3D printer. For example, FIGS. 1-5 illustrate a 3D printer 10 having features as discussed above. FIG. 1 is a perspective view of the 3D printer enclosed in cabinets. FIGS. 2-5 are perspective views, side views or top views of the 3D printer with portions removed to illustrate internal features more clearly. As shown initially in FIGS. 1 and 2, 3D printer 10 includes a build chamber cabinet 12 housing a heated build chamber 16 and a tool chamber cabinet 14 housing a separate tool chamber 18, with the tool chamber 18 positioned on top of the build chamber. The tool chamber 18 houses multiple individually powered tools, in a tool rack 22, including selectable print heads 24. In the present disclosure, four print heads 24 are illustrated. However, a 3D printer with three or more print heads 24 with different materials are utilized to print a 3D part and a purge tower are within the scope of the present disclosure.

The 3D printer 10 includes a print head carriage 26 which connects or couples to a selected tool or print head 24, with an x-y gantry 28 moving the carriage 26 and a selected print head in an x-y plane above a build plane such that the nozzle 25 is within the heated build chamber 16. The build plane is provided with a platen or platen assembly 30 (shown in FIGS. 4-5) within the build chamber 16, with the platen 30 being moved in a vertical z direction within the build chamber by a platen gantry 32. The tool chamber 18 and heated build chamber 16 are separated by a thermal insulator 20 which allows the carriage 26 to remain within the (unheated) tool chamber 18 while the nozzle 25 extends through the thermal insulator 20 into the heated build chamber 16, such that thermal isolation can be maintained between the build environment and the tool chamber 18.

In the exemplary embodiment of 3D printer 10, a print head 24 is shown engaged on a tool mount 27 of the carriage and has an inlet 23 for receiving a consumable build material and a nozzle 25 for dispensing the build material onto the platform in a flowable state. The consumable build material is provided to the print head from one or more filament spools 50 positioned within spool boxes 56*a*, 56*b*, 56*c* and 56*d* positioned on a side of the build chamber, and through filament guide tubes 54 extending from the spool boxes to the print head.

Each of the spool boxes 56*a*-56*d* typically include different materials which allows the illustrated printer to print 3D parts with one, two or three part materials, where the fourth material is a support material that is removed from the 3D part after printing. However, the disclosed printer and method of printing 3D parts and purge tower structure can utilize more than four spools of different materials where each material is processed with a separate print head.

The building materials are optionally and preferably in a filament form that is suitable for use in an extrusion-based additive manufacturing. The building material may be any extrudable material or material combinations, including amorphous or semi-crystalline thermoplastics, and thermosets, and may include fillers, chopped fibers, and/or a continuous fiber reinforcement. For example, appropriate polymers include, but are not limited to, acrylonitrile butadiene styrene (ABS), nylon, polyetherimide (PEI), polyaryletherketone (PAEK), polyether ether ketone (PEEK), polyactic acid (PLA), Liquid Crystal Polymer, polyamide, polyimide, polysulfone, polytetrafluoroethylene, polyvinylidene, and various other thermoplastics. The building materials can also optionally include filaments of the same material type with different colors.

A fiber-reinforced filament may consist of one or more types of continuous fibers. The continuous fibers may be extended, woven, or non-woven fibers in random or fixed orientations and may consist of, for example, carbon fibers, glass fibers, fabric fibers, metallic wires, and optical fibers. The fiber-reinforced filament may also consist of short fibers alone or in combination with one or more continuous fibers. Appropriate fibers or strands include those materials which impart a desired property, such as structural, conductive (electrically and/or thermally), insulative (electrically and/or thermally), and/or optical. Further, multiple types of fibers may be used in a single fiber-reinforced filament to provide multiple functionalities such as electrical and optical properties.

As shown, the x-y gantry 28 is mounted on top of the build chamber, and in an exemplary embodiment comprises an x-bridge 60, y-rails 52, and associated x and y motors for moving and positioning the carriage 26 (and any build tool installed on the carriage) in an x-y plane above the build plane. The carriage is supported on the x-bridge and includes a mount 27 for receiving and retaining print heads and a local Z positioner 72 for controllably moving a retained print head out of the x-y build plane along a perpendicular z direction axis (e.g., not in a pivoting manner). The local Z positioner operates to move a retained print head in a limited Z band of motion from a build position to a tool change position. Additionally, in some embodiments the local Z positioner 72 may be utilized while the carriage is moving in x-y or when it is in a fixed x-y position. The x-y gantry, as well as the local Z positioner, can utilize any suitable motors, actuators or systems to move the carriage and print head in the x, y and z directions as discussed.

Tool crib or rack 22 is located above the build chamber at a position reachable by the tool mount 27 when elevated by the local Z positioner 72. The tool mount may engage with and support a print head, and is used to retain and swap print heads provided in the rack. In general, any modular tools, such as print heads or any other tools (generally and collectively referred to below simply as "tools") that are removably and replaceably connectable to a 3D printer may be stored in bins of a tool rack for managing tool inventory and interchanging tools during operation of the 3D printer. In the exemplary embodiment, the local Z positioner 72 is utilized for picking and placing tools in the bins so that the 3D printer can interchangeably use the various modular tools contained in the tool rack. The tool rack may be any suitable combination of containers or other defined spaces for receiving and storing tools.

3D printer 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 38 may communicate over communication line 44 with print head 24, filament drive mechanisms, chamber 16 (e.g., with a heating unit for chamber 16), head carriage 26, motors for platen gantry 32 and x-y or head gantry 28, motors for local Z positioner 72, and various sensors, calibration devices, display devices, and/or user input devices. In some embodiments, controller assembly 38 may also communicate with one or more of platen assembly 30, platen gantry 32, x-y or head gantry 28, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct platen gantry 32 to move platen assembly 30 to a predetermined z-height within chamber 16, moving it in increments which represent the height of an individual part slice, typically 0.0050-0.020 inches in z-height. Controller assembly 38 may then direct x-y gantry 28 to move head carriage 26 (and the retained print head 24) around in the horizontal x-y plane above chamber 16, and direct the local Z positioner 72 to move the head carriage in smaller, or larger, incremental movements within the z direction relative to the x-y plane, in addition to the platen gantry z movement. Controller assembly 38 may also direct a retained print head 24 to selectively advance successive segments of the consumable filaments from consumable spools 50 through guide tubes 54 and into the print head 24. It should be noted that movements commanded by the controller assembly 38 may be directed serially or in parallel. That is, the print head 24 can be controlled to move along the x, y and z axes by simultaneous directing the x-y gantry 28 and the local Z positioner 72 to re-position the head carriage 26 along each axis.

Figure 4:
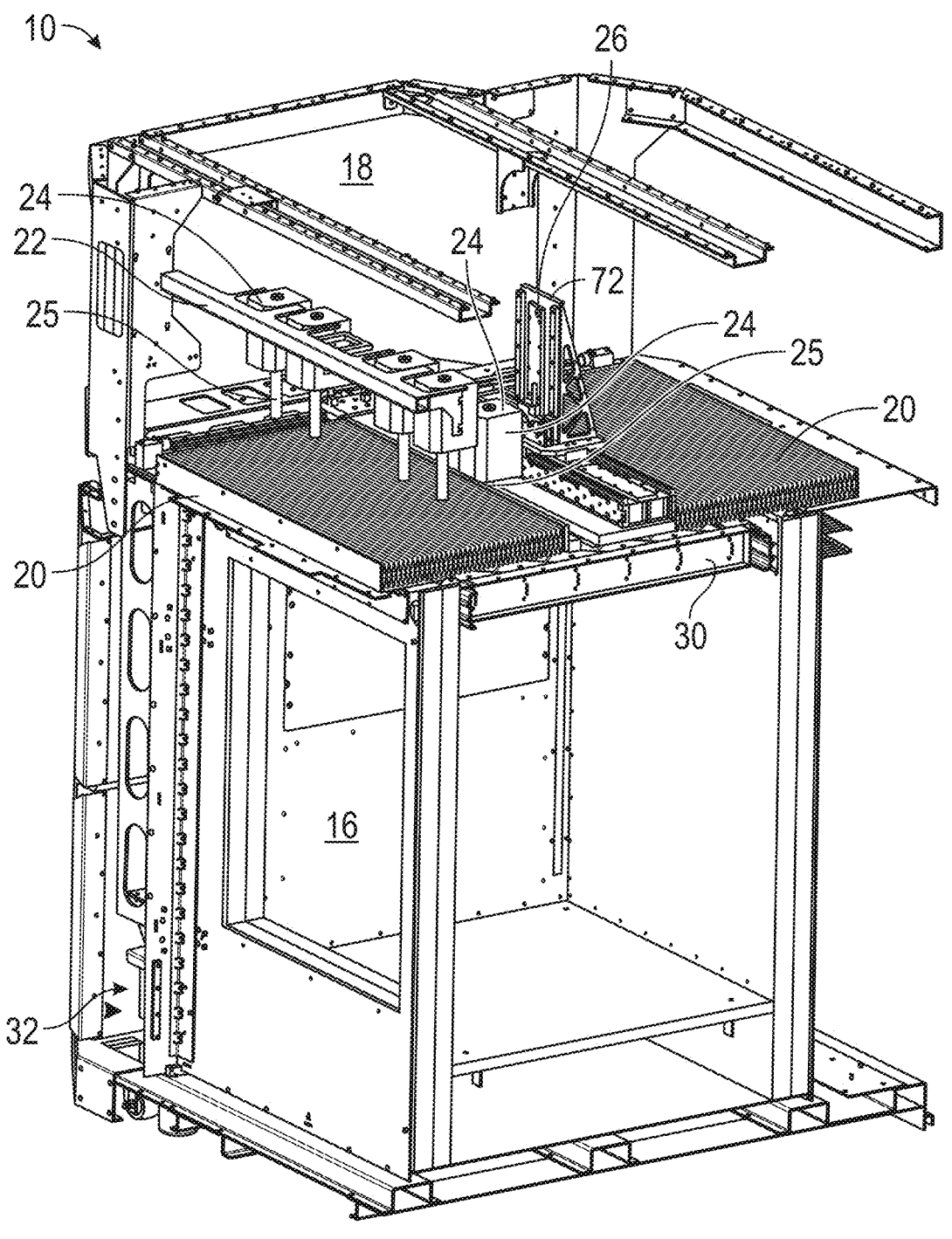

At the start of a build process, the build plane is typically at a top surface of the build platform or platen 30 (or a top surface of a build substrate mounted to the platen) as shown in FIG. 4, where the build platform is positioned to receive an extruded material from the nozzle 25 of the print head. The printing process of the multi-material, multi-node purge tower structure and the 3D part begins by printing a plurality of layers a substantially a same toolpath to ensure proper adhesion to the platen and to the successive layers. The printing process proceeds by printing several transitional layers followed by the bulk of the multi-material, multi-node purge tower structure and the 3D part.

Figure 5:
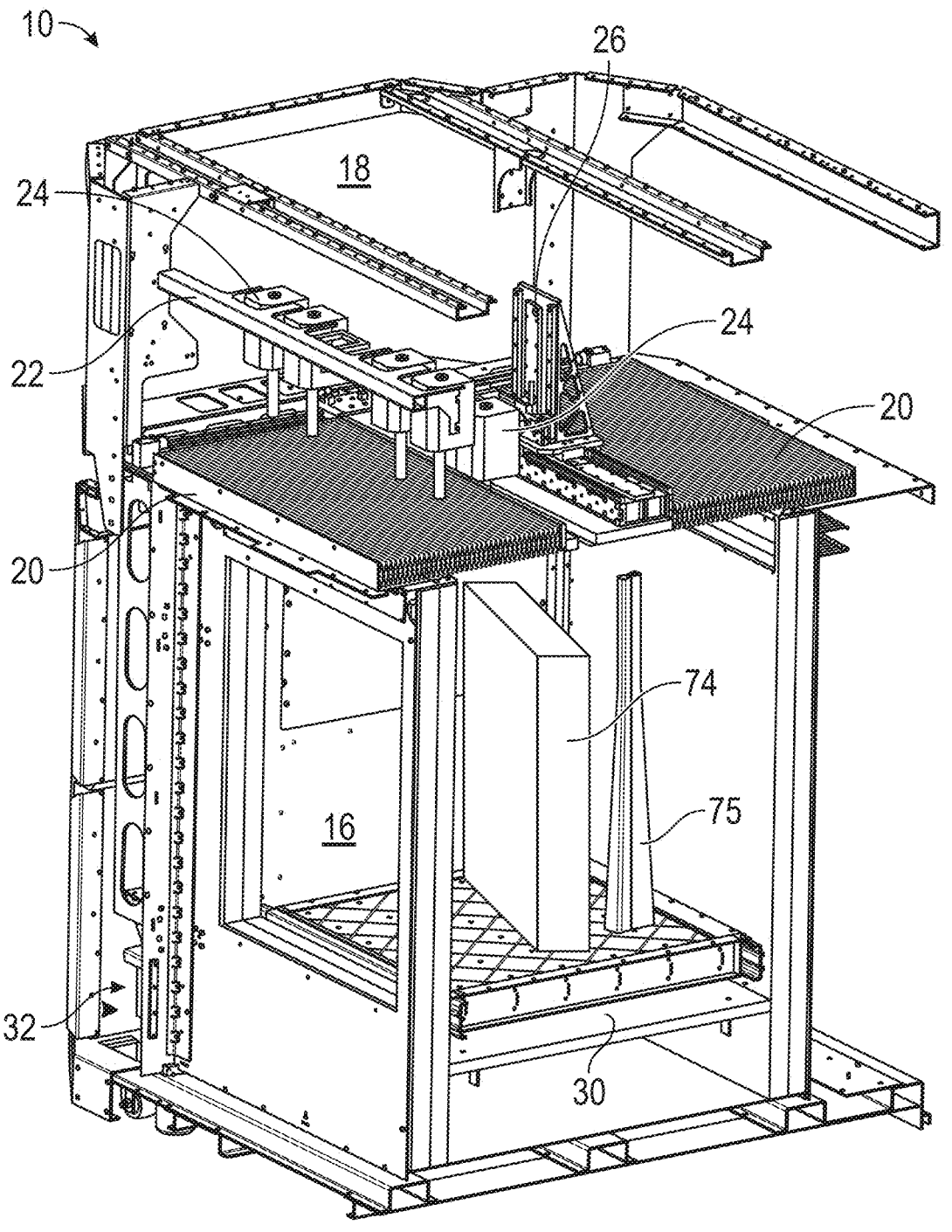

As layers of the 3D part and the multi-material, multi-node purge tower structure are built, the platen is indexed away from the build plane, allowing printing of a next layer of the 3D part and the purge tower structure in the build plane. The platen gantry 32, or primary Z positioner, moves the build platform away from the print plane in between the printing of layers of a 3D fabricated part 74 and the purge tower structure 75 (shown in FIG. 5). One or more parts and associated support structures and the purge tower can be printed in a layer-by-layer manner by incrementally lowering the platen in the z direction. FIG. 5 illustrates portions of 3D printer 10 with the platen 30 at a lowered position, achieved through numerous incremental z direction repositioning steps while printing.

Figure 6A:
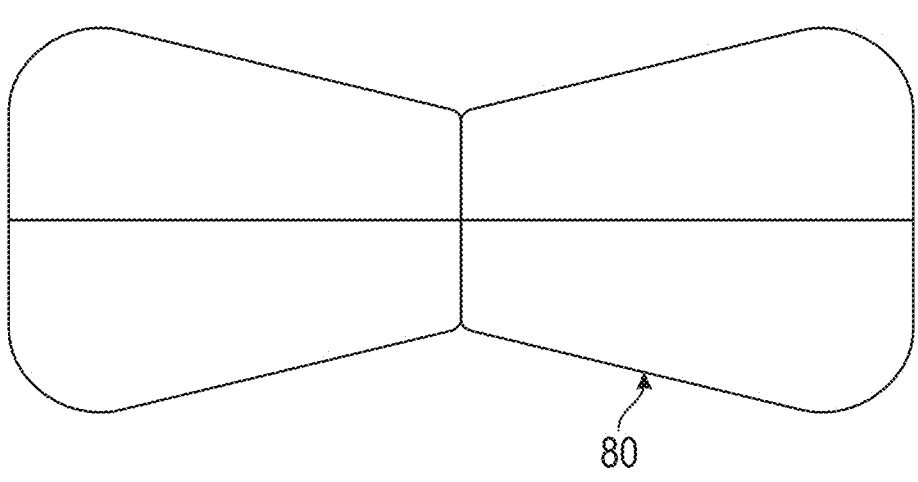
FIGS. 6A-6F are exemplary geometries for a multi-material, multi-node purge tower.
Figure 6B:
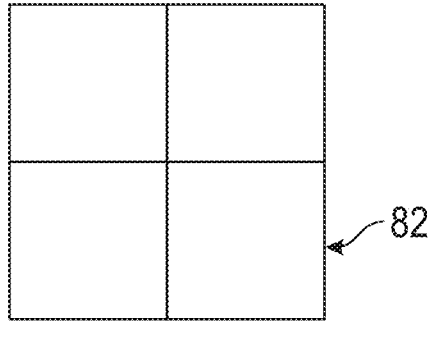
Figure 6C:
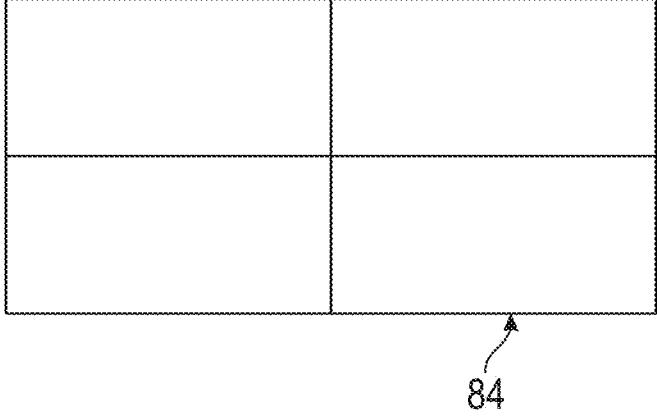
Figure 6D:
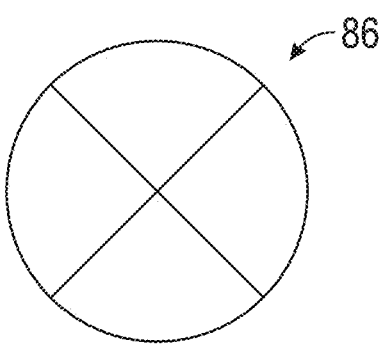
Figure 6E:
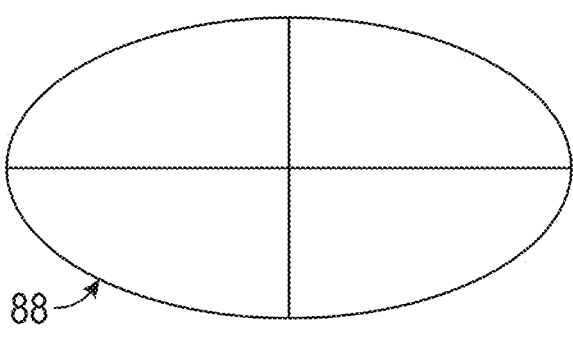
Figure 6F:
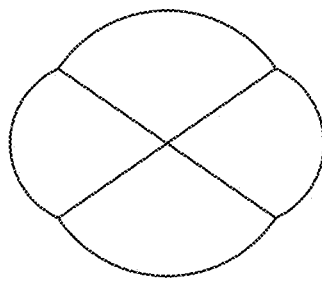

FIGS. 6A-6F are exemplary geometries for a multi-material, multi-node purge tower. In some embodiments, the external surface of the purge tower includes rounded corners and sidewalls that converge inwardly to provide stability and easy of printing as illustrated in FIG. 6A at 80 to form a bow-tie cross-sectional geometry. However other cross-section geometries of the perimeter wall of the multi-material, multi-node purge tower are also within the scope of the present disclosure square walls as illustrated at FIG. 6B at 82, rectangular walls as illustrated in FIG. 6C at 84, circular walls as illustrated at FIG. 6D at 86, elliptical walls as illustrated in FIG. 6E at 88, a flower petal geometry as illustrated in FIG. 6F at 90, and the like.

Whatever the perimeter wall geometry, the subdivisions have adjacent segments that bond together. In some embodiments, each subdivision is bonded to adjacent subdivisions on either side such that two interior segments of each subdivision are bonded to another subdivision. Again, a typical starting and stopping point for the subdivisions is at an exterior surface so as to avoid having printing errors associated with starting and stopping extrusion (i.e., at a seam) from affecting the printing of other subdivisions.

A method of printing a multi-material, multi-node purge tower structure and a multi-material part is illustrated in FIG. 7 at 100. The method 100 includes receiving a digital representation of a multi-material 3D part that is to be printed using N number of print heads for printing specified part materials and support material, and determining regions of the 3D that require support material at step 102. The digital representation of the multi-material 3D part and associated support structure are sliced into layers in step 104. The number of materials in each slice are determined to determine the maximum number of materials (M) required to print a single layer at step 106. By way of example, the number M could be less than the total number of materials used to print a multi-material part, such as where the part is printed using four materials, but the maximum number of materials in a given layer is three materials. As such, M would be three and a three-subdivision structure could be utilized as the purge tower structure.

A digital model of a multi-material, multi-node purge tower structure having N number of subdivisions is created or selected from a library of digital models at step 108. The digital model of the multi-material, multi-node purge tower is sliced to match the slices of the digital model of the 3D part at step 110. The number of materials in each layer of the digital representation of the 3D part is determined and matched to a respective layer of the multi-material, multi-node purge tower structure at step 112. Toolpaths are then created for each subdivision of each slice of the purge tower structure based upon the number of materials used to print the 3D part at step 114. The subdivisions of the multi-material, multi-node purge tower layers are printed using the toolpaths generated in step 114 using the number of print heads associated with the number of materials used to print the layer of the multi-material 3D part such that the multi-material, multi-node purge tower layer and the multi-material part are at substantially a same height when the layers are completed at step 116. The layer by layer process is continued until the purge tower structure and the 3D multi-material part are completed at step 118. Those skilled in the art will recognize that some steps of the disclosed printing method may vary in their order of performance and specific manner of performance, while remaining within the scope of the present invention.

In another method, the number of subdivisions of the multi-material, multi-node purge tower is equal to the number of print heads in the 3D printer. The tool paths of the subdivisions are then assigned to the number of print heads that are used in a particular layer to print each layer of the multi-material, multi-node purge tower.

When a print head is not utilized in a layer of the part, the subdivision for the assigned, idle print head is reassigned to a print head that is active in that layer to maintain continuity in height of the purge tower with the multi-material part being printed. However, is within the scope of the present disclosure to skip an assigned subdivision in the purge tower and increase the volume of extruded material (e.g., by increasing the extrusion flow rate) in a next layer of the subdivision to print a double-height layer within the subdivision, thereby maintaining continuity in height of the purge tower despite the print head being inactive or idle in the prior layer of the multi-material part being printed.

EXAMPLES

The present disclosure is more particularly described in the following examples that are intended as illustrations only, since numerous modifications and variations within the scope of the present disclosure will be apparent to those skilled in the art.

Example 1

The present example illustrates the printing of a multi-material, multi-node purge tower structure for a three-material part with a support structure, making the maximum number of materials in a single sliced layer of the multi-material 3D part to be four. The example corresponds to the four, print head printer illustrated in FIGS. 1-5.

Figure 8A:
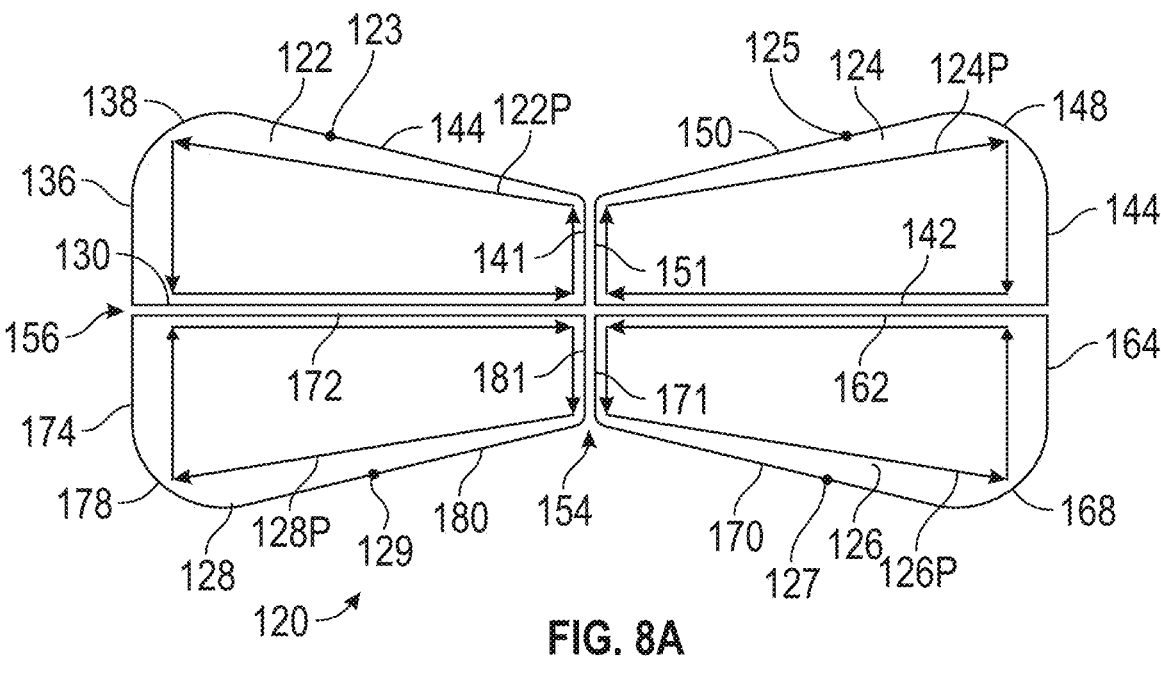
FIGS. 8A-8F are schematic drawings of a toolpaths and purge towers for a four subdivision multi-material, multi-node purge tower structure.

The multi-material, multi-node purge tower structure includes four subdivisions that correspond to the four materials that are used to print a 3D part. The toolpaths for a layer of the multi-material, multi-node purge tower structure are illustrated in FIG. 8A at 120. The toolpaths 122*p*, 124*p*, 126*p* and 128*p* for four subdivisions 122, 124, 126 and 128 are closed looped where the starting point 123, 125, 127 and 129, respectively, and the stopping point are proximate each other. The location of the starting point 123, 125, 127 and 129 are exemplary and non-limiting in nature. However, the starting point 123, 125, 127 and 129 are preferably located on an exterior tool path to minimize printing errors.

The subdivision 122 includes a substantially straight x-direction internal tool path segment 130 that transitions into an exterior toolpath segment 134 having a substantially y-direction portion 136 that transitions into a rounded corner portion 138 that transitions into an inwardly sloped portion 140 that extends to about a midline of the structure. The subdivision 122 includes an interior y-direction segment 141 that leads back to the starting point 123 on the tool path 140.

The subdivision 124 is substantially a mirror image of the subdivision 122 in the y direction. The subdivision 124 includes a substantially straight x-direction internal tool path segment 142 that transitions to an exterior tool path segment 144 having a substantially y-direction portion that transitions into a rounded corner portion 148 that transitions into an inwardly sloped portion 150 that extends to about a midline of the structure. The subdivision 124 includes an interior y-direction segment 151 that leads back to the starting point 125 on the tool path 150. The toolpaths segments 151 and 141 are adjacent each other such that when material is extruded along the toolpath segments, the extruded materials laterally bonds at the interface 154 between the subdivision 122 and 124.

The subdivision 126 is substantially a mirror image of the subdivision 124 in the x direction. The subdivision 124 includes a substantially straight x-direction internal tool path segment 162 that transitions to an exterior tool path segment 164 having a substantially y-direction portion that transitions into a rounded corner portion 168 that transitions into an inwardly sloped portion 170 that extends to about a midline of the structure. The subdivision 126 includes an interior y-direction segment 171 that leads back to the starting point 127 on the tool path. The toolpaths segments 162 and 142 are adjacent each other such that when material is extruded along the toolpath segments, the extruded materials laterally bonds at the interface 156 between the subdivision 124 and 126.

The subdivision 218 is substantially a mirror image of the subdivision 126 in the y direction and the mirror image of the subdivision 122 in the x direction. The subdivision 128 includes a substantially straight x direction internal tool path segment 172 that transitions to an exterior tool path segment 174 having a substantially y-direction portion that transitions into a rounded corner portion 178 that transitions into an inwardly sloped portion 180 that extends to about a midline of the structure. The subdivision 128 includes an interior y-direction segment 181 that leads back to the starting point on the tool path 180. The toolpaths segments 172 and 130 are adjacent each other such that when material is extruded along the toolpath segments, the extruded materials laterally bonds at the interface 156 between the subdivision 128 and 122 and the toolpath segments 171 and 181 are adjacent each other such that when material is extruded along the toolpath segments, the extruded materials laterally bonds at the interface 154.

The bonding or adhesion of the subdivisions 122, 124, 126 and 128 at the interfaces 154 and 156 provide lateral strength to the structure by connecting each of the subdivisions to an adjacent subdivision. Additionally, the toolpaths in the subdivisions 122, 124, 126 and 128 do not intersect which provides for a faster printing operation and flexibility in printing the layers, whether with one material, two materials, three materials or four materials.

Figure 8B:
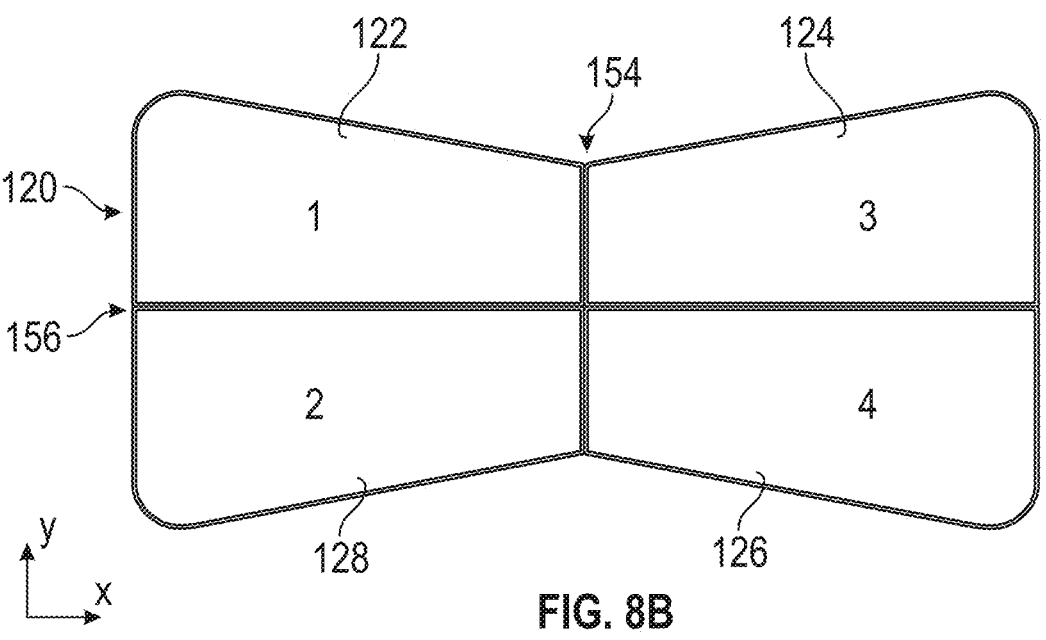
Figure 8C:
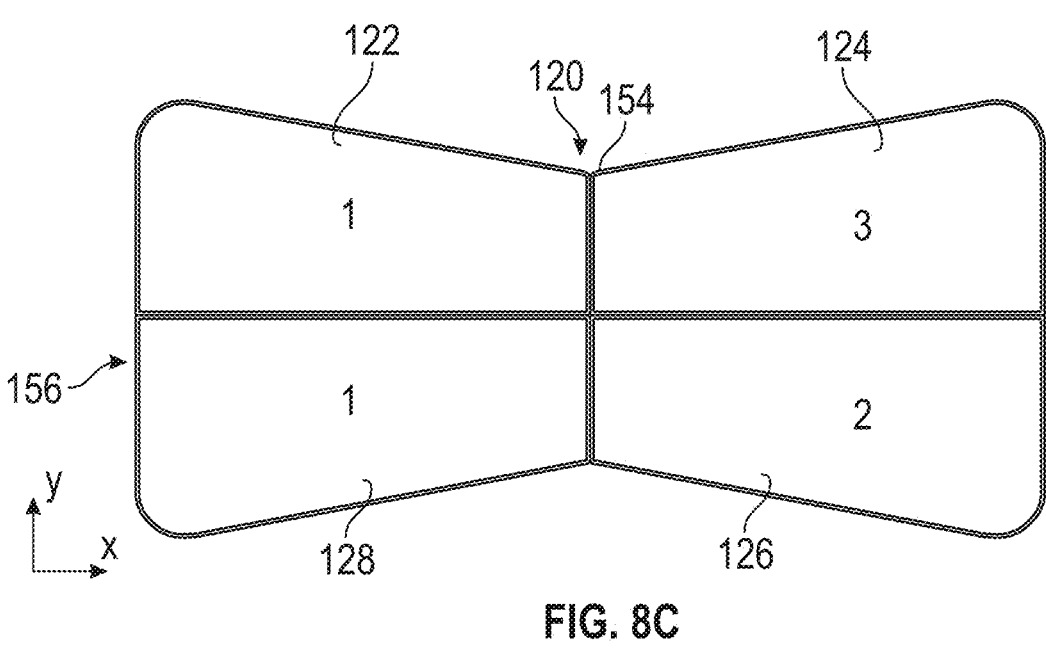
Figure 8D:
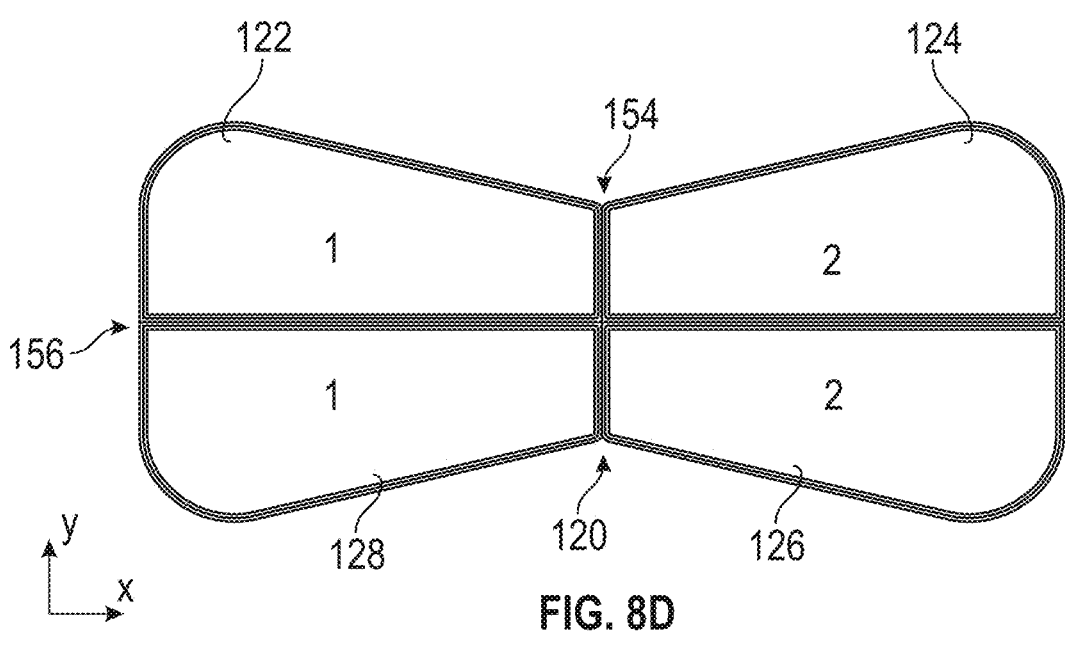
Figure 8E:
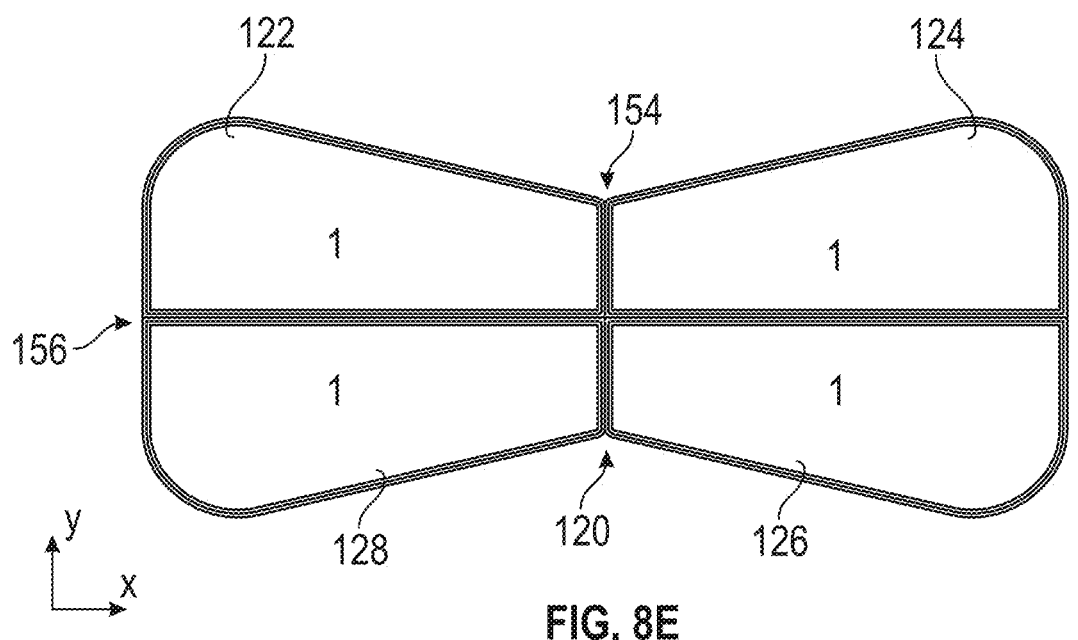

Depending upon the number of materials required to print a layer of the 3D part, the material deposited to print the layer of the subdivisions can be adjusted. Referring to FIG. 8B, a layer with four materials is illustrated where the subdivision 122 is printed with a first material, the subdivision 128 is printed with a second material, the subdivision 124 is printed with a third material and the subdivision 126 is printed with a fourth material. Referring to FIG. 8C, a layer with three materials is illustrated where the subdivisions 122 and 128 are printed with a first material, the subdivision 126 is printed with the second material and the subdivision 124 is printed with the third material. Referring to FIG. 8D, a layer with two materials is illustrated where the subdivisions 122 and 128 and printed with the first material and the subdivisions 124 and 126 are printed with the second material. Referring to FIG. 8E, a layer with a single material is illustrated where the subdivisions 122, 124, 126 and 128 are printed with a single material.

Figure 8F:
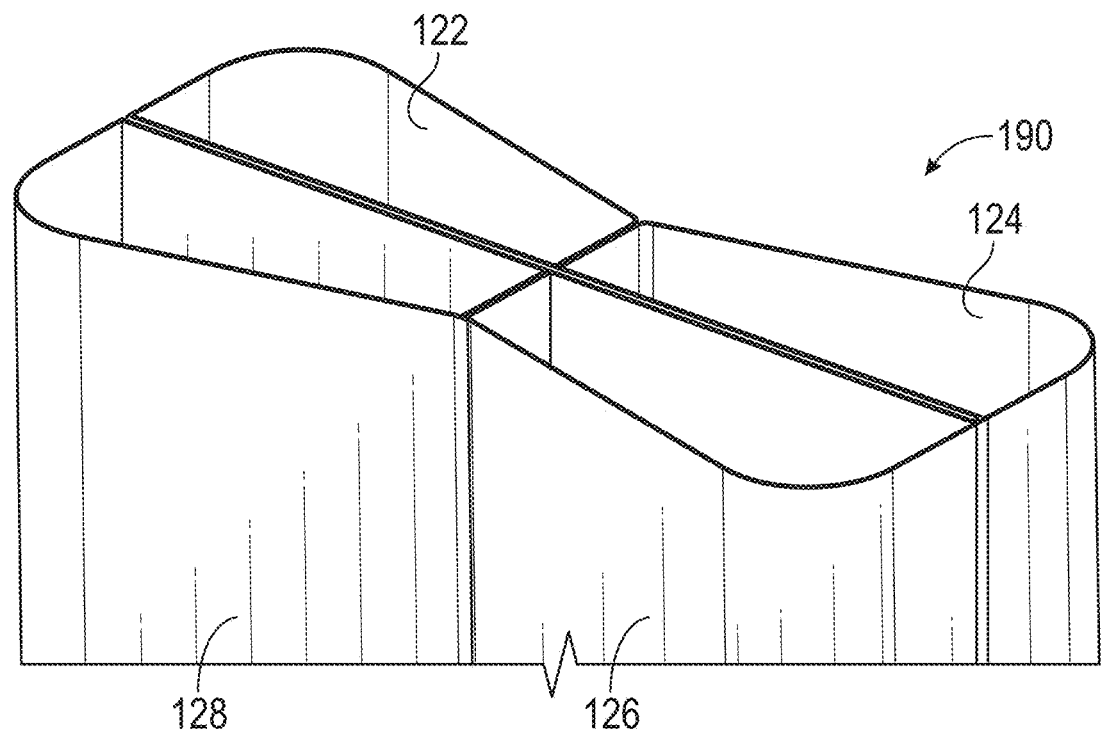
Figure 8G:
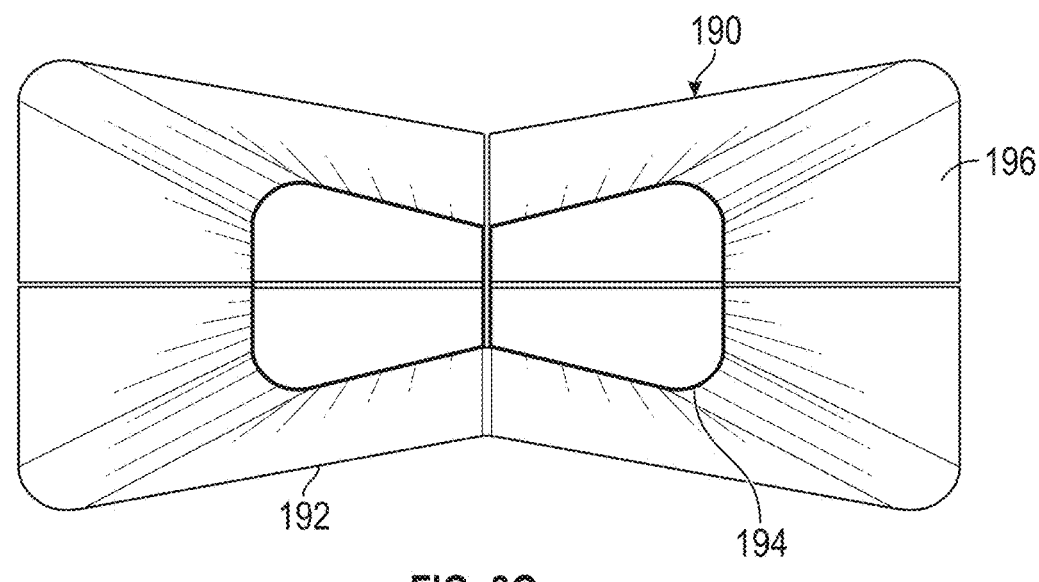
FIG. 8G is a top view of the purge towers illustrated in FIGS. 8A-8F.

A side perspective view of an upper portion of the multi-material, four-node purge tower structure 190 is illustrated in FIGS. 8F, where layers of purged material is used to build or print the tower in the z-direction. FIG. 8F illustrates the four subdivisions 122, 124, 126 and 128 where adjacent subdivisions are bonded together at interior segments such that each subdivision is supported by two adjacent subdivisions where the extruded material does not cross between subdivisions. FIG. 8G is a top view of the purge tower 190 where purged material is used print the purge tower in a layer-by-layer manner in the z-direction. The purge tower 190 includes a base 192 that is larger than a top layer 194 where the exterior walls 196 taper inwardly to provide additional stability to allow the multi-material, multi-node purge tower structure 190 to achieve heights that are similar to that of the 3D part being printed. Also, the length of the toolpaths at the top layer 194 remain sufficiently long such that a required volume of material is extruded from the respective print head to bring the print heat to operating conditions to accurately print the 3D parts.

Example 2

The present example illustrates the printing of a multi-material, multi-node purge tower structure for a two-material part with a support structure, making the maximum number of materials in a single sliced layer of the multi-material 3D part to be three. The example can be utilized with the four, print head printer illustrated in FIGS. 1-5 where one print head remains in standby mode during the printing of the 3D part or a 3D printer with three print heads.

Figure 9A:
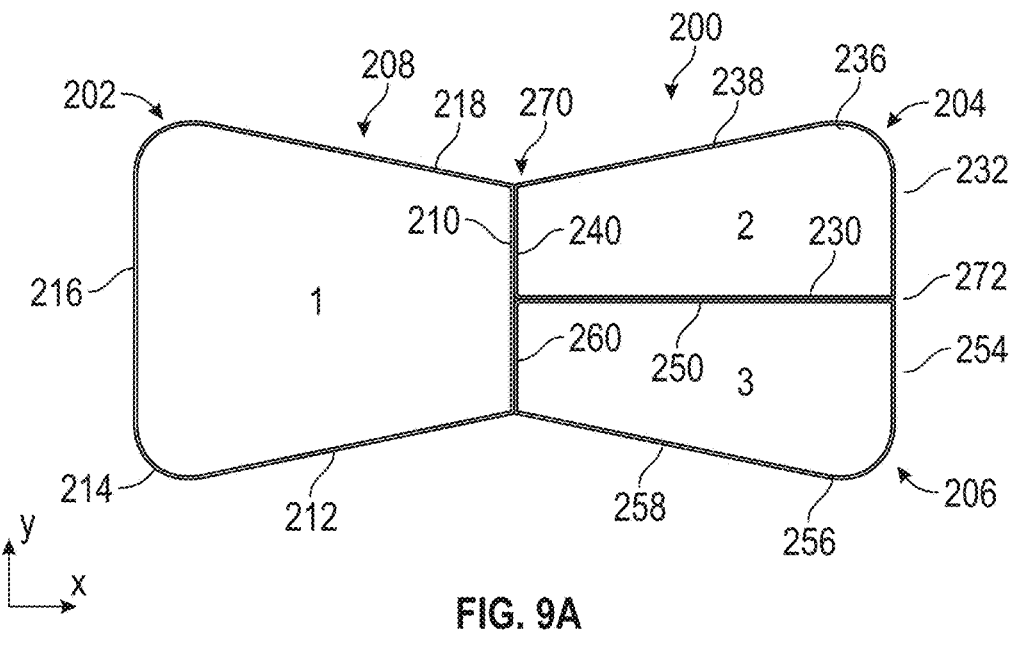
FIGS. 9A-9C are schematic drawings of a tool path of a three subdivision multi-material, multi-node purge tower structure.

Referring to FIG. 9A, a three, subdivision configuration of the multi-material, multi-node purge tower structure is illustrated at 200. The three-subdivision configuration includes a subdivision 202 and subdivisions 204 and 206, where the subdivision 202 defines about half of the area of the layer and the combination of the subdivisions 204 and 206 define about the other half of the area of the layer. The subdivisions 204 and 206 are mirror images of each other in the x direction and the exterior surface of the subdivision 202 and the exterior surfaces of the subdivisions 204 and 206 are mirror images of each other.

The subdivision 202 has a continuous tool path without overlapping or intersections. The subdivision 202 includes a tool path 208 with an interior portion 210 substantially in the y direction that transitions to an outwardly sloped exterior portion 212 that leads to a rounded corner portion 214. The rounded corner portion 214 transitions to an exterior y direction portion 216 that transitions to another rounded corner 218. The tool path 208 continues from the rounded corner 218 to an inwardly sloped portion 220 that terminates proximate an end of the interior portion 210.

The subdivision 204 is substantially similar to the subdivision 124 in Example 1. The subdivision 204 includes a substantially straight x-direction internal tool path segment 230 that transitions to an exterior tool path segment 232 having a substantially y-direction portion that transitions into a rounded corner portion 236 that transitions into an inwardly sloped portion 238 that extends to about a midline of the structure. The subdivision 204 includes an interior y-direction segment 240 that terminates at a starting point of the substantially straight x-direction internal tool path segment 230. The toolpaths segments 210 and 240 are adjacent each other such that when material is extruded along the toolpath segments, the extruded materials laterally bonds at the interface 154 between the subdivision 202 and 204.

The subdivision 206 is substantially similar to the subdivision 126 in Example 1 and is a mirror image of the subdivision 204 in the x direction. The subdivision 206 includes a substantially straight x-direction internal tool path segment 250 that transitions to an exterior tool path segment 252 having a substantially y-direction portion that transitions into a rounded corner portion 256 that transitions into an inwardly sloped portion 258 that extends to about a midline of the structure. The subdivision 206 includes an interior y-direction segment 260 that terminates at a starting point of the substantially straight x-direction internal tool path segment 250. The toolpaths segments 230 and 250 are adjacent each other such that when material is extruded along the toolpath segments, the extruded materials laterally bonds at the interface 272 between the subdivision 204 and 206 and the segments 260 and portion 210 are adjacent each other such that when material is extruded along the toolpath segments, the extruded materials laterally bonds along the interface 270.

The bonding or adhesion of the subdivisions 202, 204 and 206 at the interfaces 270 and 272 provide lateral strength to the structure by connecting each of the subdivisions to an adjacent subdivision. Additionally, the toolpaths in the subdivisions 202, 2024 and 206 do not intersect which provides for a faster printing operation and flexibility in printing the layers, whether with one material, two materials, three materials or four materials.

Figure 9B:
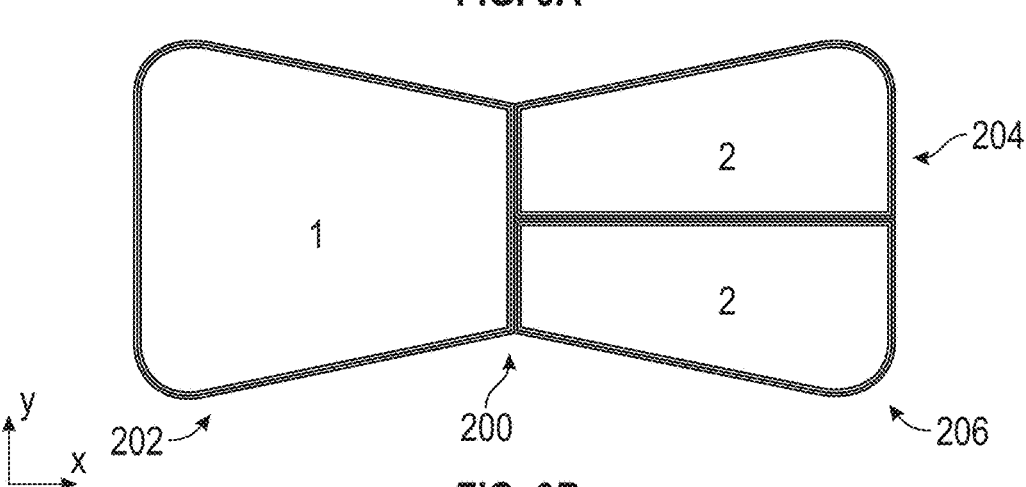
Figures 9C, 10A, 10B:
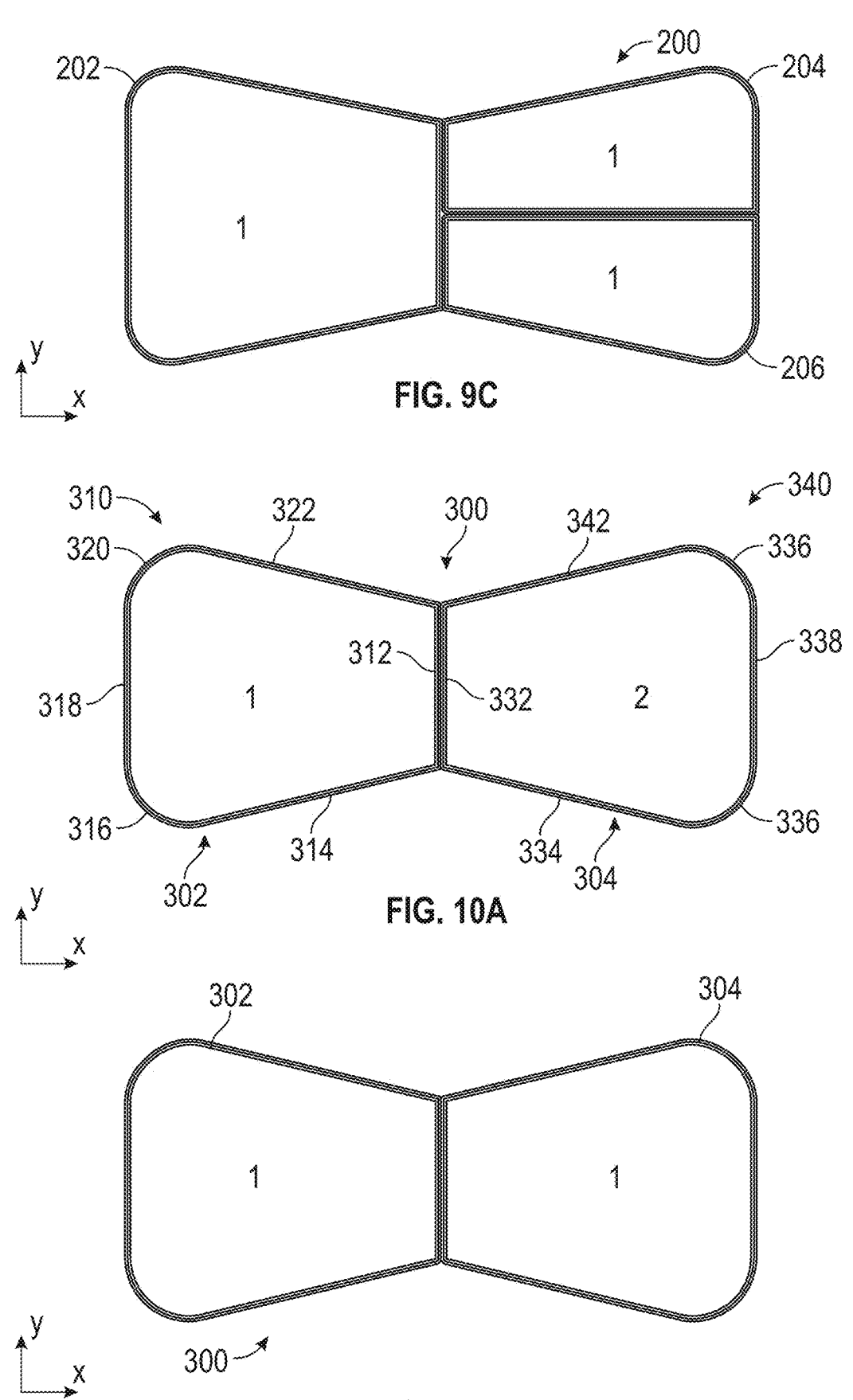
FIGS. 10A-10B are schematic drawings of a tool path of a two subdivision multi-material, multi-node purge tower structure.

FIG. 9A illustrated toolpaths for a three, subdivision configuration of the multi-material, multi-node purge tower structure where three materials are to be printed. FIG. 9B illustrates the three-subdivision configuration of the multi-material, multi-node purge tower structure where two materials are to be printed. FIG. 9C illustrates the three-subdivision configuration of the multi-material, multi-node purge tower structure where a single material is printed.

Example 3

The present example illustrates the printing of a multi-material, multi-node purge tower structure where the maximum number of materials in a single sliced layer of the multi-material 3D part to be two. The example can be utilized with the four, print head printer illustrated in FIGS. 1-5 where two of the print heads remain in standby mode during the printing of the 3D part or a 3D printer with two print heads.

Referring to FIG. 10A, a two-subdivision configuration of the multi-material, multi-node purge tower is illustrated at 300. The two-subdivision configuration includes a subdivision 302 and a subdivision 304 where the subdivisions 302 and 304 are mirror images of each other in the y direction and include continuous tool paths that without overlapping or intersections.

The subdivision 302 includes a toolpath 310 with an interior portion 312 substantially in the y direction that transitions to an outwardly sloped exterior portion 314 that leads to a rounded corner portion 316. The rounded corner portion 316 transitions to an exterior y direction portion 318 that transitions to another rounded corner 320. The tool path 310 continues from the rounded corner 320 to an inwardly sloped portion 322 that terminates proximate an end of the interior portion 312.

The subdivision 304 includes a toolpath 330 with an interior portion 332 substantially in the y direction that transitions to an outwardly sloped exterior portion 334 that leads to a rounded corner portion 336. The rounded corner portion 336 transitions to an exterior y direction portion 338 that transitions to another rounded corner 240. The tool path 330 continues from the rounded corner 340 to an inwardly sloped portion 342 that terminates proximate an end of the interior portion 332.

The toolpaths segments 312 and 332 are adjacent each other such that when material is extruded along the toolpath segments, the extruded materials laterally bond at the interface 344 between the subdivision 302 and 304.

As illustrated in FIG. 10A, a layer is printed with the subdivision 302 printed with a first material and the subdivision 304 printed with a second material. As illustrated in in FIG. 10B, both subdivisions 302 and 304 are printed with a single material and follow the toolpaths 310 and 330. By printing complete layers of the of the multi-material, multi-node purge tower structure as the 3D part is printed in a layer-wise manner allows print heads for the next layer to be brought from a standby condition to an operating condition prior to printing the layer of the 3D part.

The bonding or adhesion of the subdivisions 252 and 254 at the interface 294 provide lateral strength to the structure by connecting the subdivisions 252 and 254. Additionally, the toolpaths in the subdivisions 252 and 254 intersect which provides for a faster printing operation and flexibility in printing the layers, whether with one material or two materials.

Example 4

Another geometry of a purge tower is illustrated in the shape of a square that can be used as a multi-material purge tower. In this example, the square is stellated from one tool path to eight subdivisions of tool paths where the tool paths are a closed geometry, the tool paths do not overlap and adjacent subdivisions have sufficient contact to provide support to each other. Example 4 illustrates that the same outer geometry can be utilized as a purge tower for a print job that utilizes 1 to N print heads, where in this example N is 8.

Figures 11A, 11B, 11C, 11D, 11E, 11F, 11G, 11H:
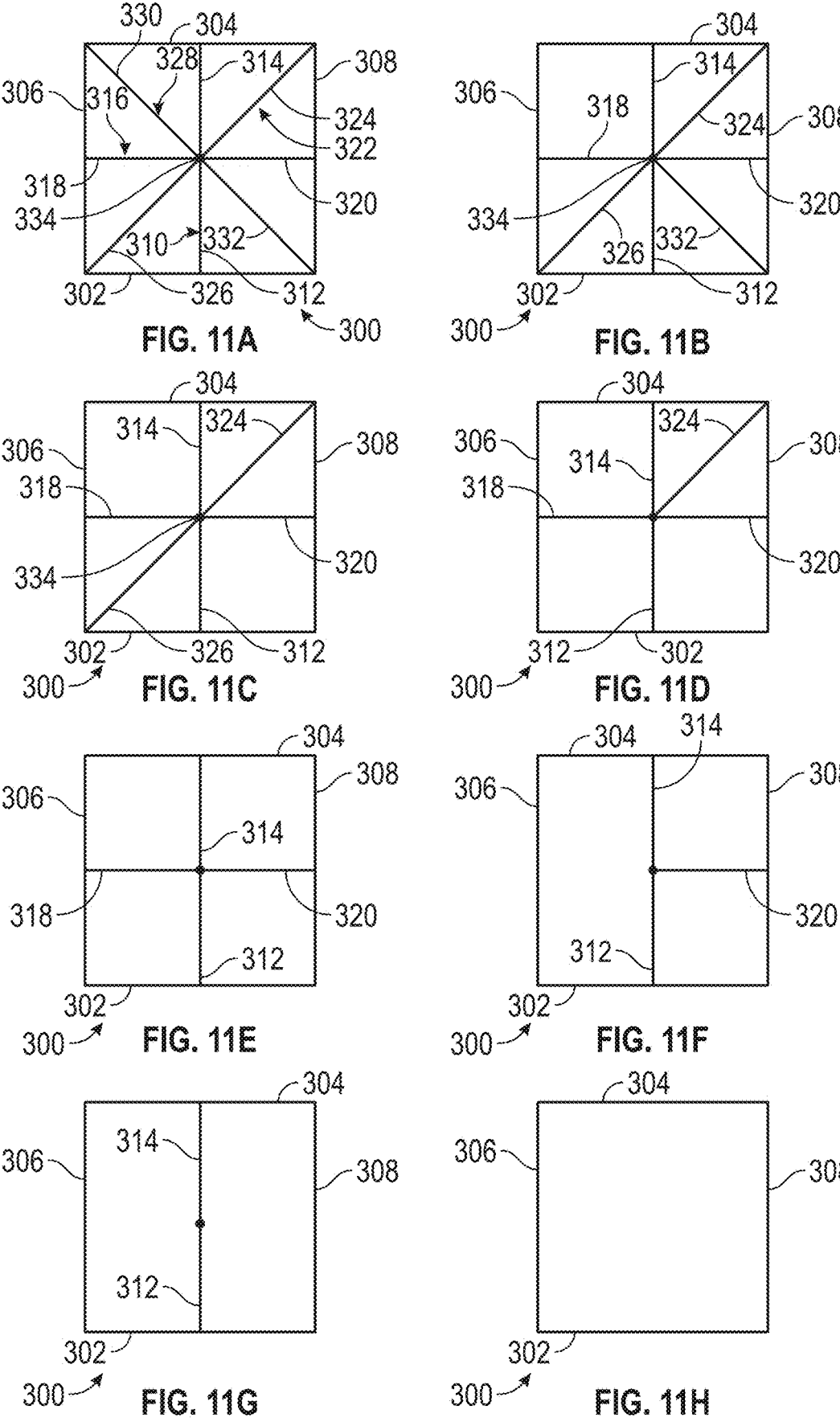
FIGS. 11A-11H are schematic drawings of tool paths for a square having one to eight subdivisions.

Referring to FIG. 11A, toolpaths for a purge tower with eight subdivisions is illustrated at 300. The purge tower tool paths include outer horizontal tool paths 302 and 304 and outer vertical tool paths 306 and 308. The toolpaths include an interior vertical toolpath 310 having segments 312 and 314 and interior horizontal tool path 316 having segments 318 and 320. The toolpaths include a first slanted toolpath 322 having segments 324 and 326 and second slanted tool paths 328 that include segments 330 and 332. The segments 312, 314, 318, 320, 324, 326, 330 and 332 join at a centerpoint 334 and provide support for adjacent subdivisions.

Referring to FIG. 11B, the segment 330 is removed to form a seven-subdivision purge tower. In FIG. 11C both segments 330 and 332 are removed to form a six-subdivision purge tower. In FIG. 11D, segments 330, 332 and 326 are removed to form a five-subdivision purge tower. In FIG. 11E, segments 330, 332, 326 and 324 are removed to form a four-subdivision purge tower. In FIG. 11F, segments 330, 332, 326, 324, and 318 are removed to form a three-subdivision purge tower. In FIG. 11G, the segments 330, 332, 326, 324, 318 and 320 are removed to form a two-subdivision purge tower. In FIG. 11H, the segments 330, 332, 326, 324, 318, 320, 312 and 314 are removed to have a single closed shape.

Example 5

Another geometry of a purge tower is illustrated in the shape of a circle that can be used as a multi-material purge tower. In this example, the circle is stellated from one tool path to eight wedge-shaped subdivisions of tool paths where the tool paths are a closed geometry, the tool paths do not overlap and adjacent subdivisions have sufficient contact to provide support to each other. Example 5 illustrates that the same outer geometry can be utilized as a purge tower for a print job that utilizes 1 to N print heads, where in this example N is 8.

Referring to FIG. 12A, toolpaths for a purge tower with eight subdivisions is illustrated at 400. The purge tower tool paths include outer circular tool paths 402 The toolpaths include an interior vertical toolpath 410 having segments 412 and 414 and interior horizontal tool path 416 having segments 418 and 420. The toolpaths include a first slanted toolpath 422 having segments 424 and 426 and second slanted tool paths 428 that include segments 430 and 432. The segments 412, 414, 418, 420, 424, 426, 430 and 432 join at a centerpoint 434 and provide support for adjacent subdivisions.

Referring to FIG. 12B, the segment 430 is removed to form a seven-subdivision purge tower. In FIG. 12C both segments 430 and 432 are removed to form a six-subdivision purge tower. In FIG. 12D, segments 430, 432 and 426 are removed to form a five-subdivision purge tower. In FIG. 12E, segments 430, 432, 426 and 424 are removed to form a four-subdivision purge tower. In FIG. 12F, segments 430, 432, 426, 424, and 418 are removed to form a three-subdivision purge tower. In FIG. 12G, the segments 430, 432, 426, 424, 418 and 420 are removed to form a two-subdivision purge tower. In FIG. 12H, the segments 430, 432, 426, 424, 418, 420, 412 and 414 are removed to have a single closed shape.

Example 6

Another geometry of a purge tower is illustrated in the shape of a cross that can be used as a multi-material purge tower. In this example, the cross is stellated from one tool path to eight subdivisions of tool paths where the tool paths are a closed geometry, the tool paths do not overlap and adjacent subdivisions have sufficient contact to provide support to each other. Example 6 illustrates that the same outer geometry can be utilized as a purge tower for a print job that utilizes 1 to N print heads, where in this example N is 8.

Figure 13A:
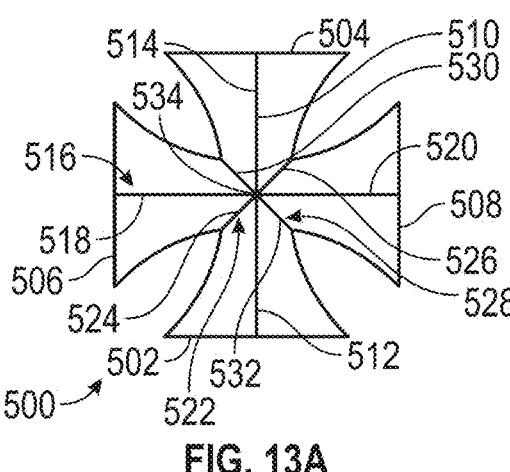
FIGS. 13A-13H are schematic drawings for tool paths of a cross having one to eight subdivisions.

Referring to FIG. 13A, toolpaths for a purge tower with eight subdivisions is illustrated at 500. The purge tower tool paths include outer horizontal tool paths for lobes 502, 504, 506 and 508. The toolpaths include an interior vertical toolpath 510 having segments 512 and 514 and interior horizontal tool path 516 having segments 518 and 520. The toolpaths include a first slanted toolpath 522 having segments 524 and 526 and second slanted tool paths 528 that include segments 530 and 532. The segments 512, 514, 518, 520, 524, 526, 530 and 532 join at a centerpoint 534 and provide support for adjacent subdivisions.

Figure 13B:
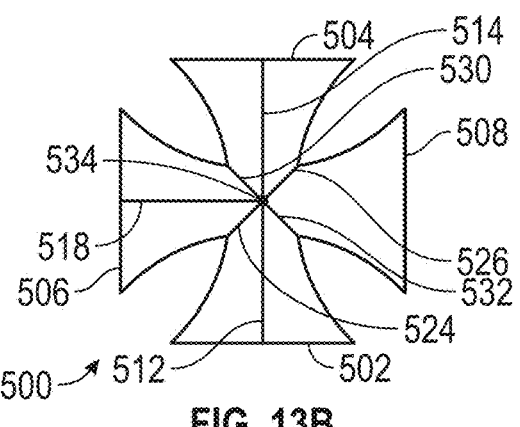
Figure 13C:
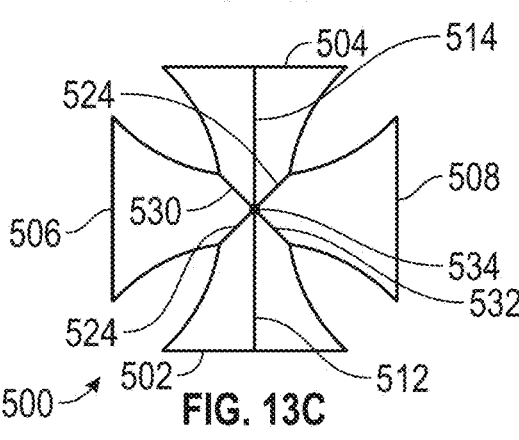
Figure 13D:
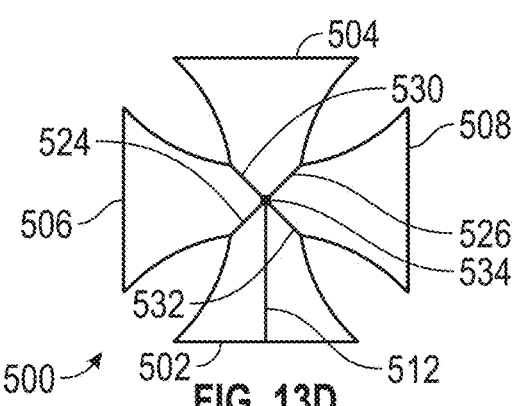
Figure 13E:
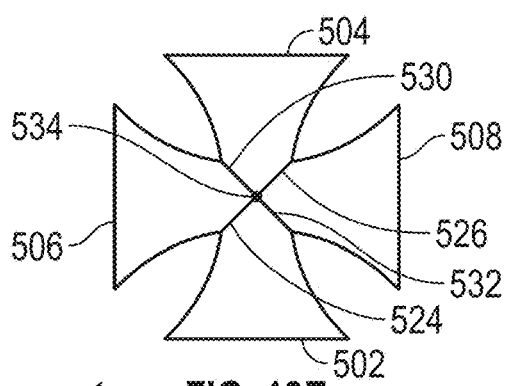
Figure 13F:
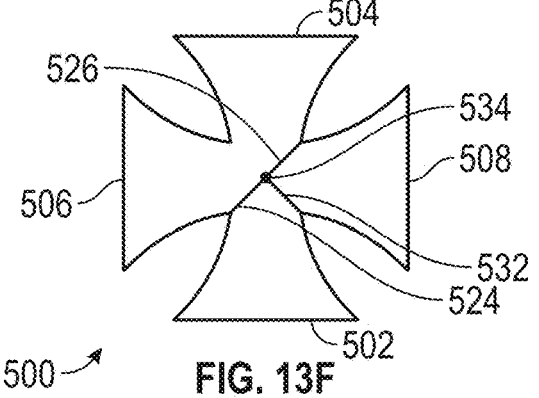
Figure 13G:
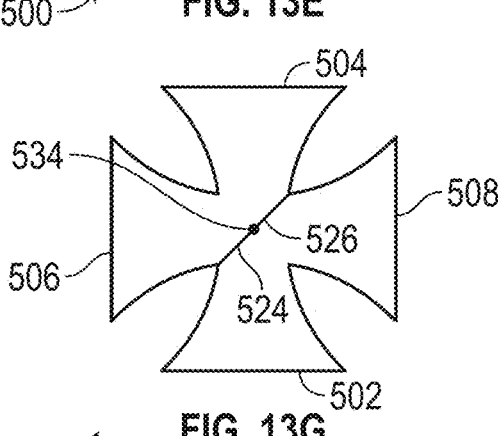
Figure 13H:
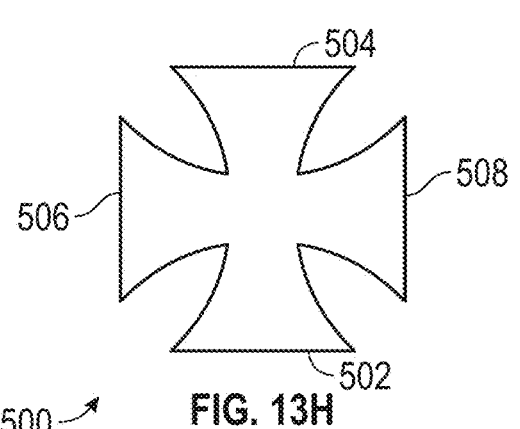

Referring to FIG. 13B, the segment 520 is removed to form a seven-subdivision purge tower. In FIG. 13C both segments 520 and 518 are removed to form a six-subdivision purge tower. In FIG. 13D, segments 520, 518 and 514 are removed to form a five-subdivision purge tower. In FIG. 13E, segments 520, 518, 514 and 512 are removed to form a four-subdivision purge tower. In FIG. 13F, segments 520, 518, 514, 512 and 530 are removed to form a three-subdivision purge tower. In FIG. 13G, the segments 520, 518, 514, 512, 530 and 532 are removed to form a two-subdivision purge tower. In FIG. 13H, the segments 520, 518, 514, 512, 530, 532, 524 and 526 are removed to have a single closed shape.

The structure of the layers and subdivisions represented in Examples 1-5 are illustrative in nature and are not limiting to scope of the present disclosure. Other configurations of the multi-material, multi-node purge tower structures with adjacent subdivisions are within the scope of the present disclosure. Further, while Examples 1-5 reference the multi-material, multi-node purge tower structure in reference to the x and y directions, the multi-material, multi-node purge tower structure can be any in any orientation when printed and be within the scope of the present disclosure.

Example 7

The purge tower configurations illustrated in Examples 1 through 6 utilize common design parameters to efficiently print a stable multi-material tower structure. The design parameters include the following:

All nodes must have enough wall to wall contact along an interface with neighboring nodes to provide a stable structure which will not topple as the structure grows higher.

Tower walls must either be straight, or decreasing in cross-section, in order to provide a stable structure. The tower must not get larger in geometric diameter as the build progresses.

Each subdivision or node of the tower need not be identical in shape, is typically substantially similar in cumulative toolpath length. However, in some instances, there may be reasons to select toolpaths of different lengths so long the tool paths length for each extruder is sufficiently long to provide a stable structure and prepare an extruder to print a portion of a part with good part quality. Each subdivision need not exclude geometric corners, although corners will slow the speed of the build.

The toolpath of each subdivision is preferred to be closed, meaning that the toolpaths of each one will start and end at the same location.

Toolpaths cannot pass over existing toolpaths of other subdivisions.

The toolpath length for each subdivision is selected so that a sufficient volume of material will be purged and put the extruder in a known good state, while minimizing material waste due to building a purge structure.

The geometry of the multi-node tower can be selected from a variety of shapes which incorporate similar sized nodes which touch each other.

Although the present disclosure may have been described with reference to preferred embodiments, workers skilled in the art will recognize that changes may be made in form and detail, including in the order that steps of the disclosed printing methods are performed, without departing from the spirit and scope of the disclosure.

The invention claimed is:

1. A method of printing a multi-material part in a layer-wise manner with an extrusion-based 3D printer, the method comprising:

providing a sliced digital model of a multi-material part;

determining a number of materials in each of the slices of the digital model;

utilizing a digital model of a purge tower having a multi-node configuration comprising N subdivisions each having a closed geometry, wherein N is the number of print heads needed to print the part and is a number greater than or equal to three, each subdivision being adjacent to at least two other subdivisions;

assigning each print head to one subdivision and to one or more toolpaths forming the one subdivision in each layer, wherein portions of the toolpaths of adjacent subdivisions of the purge tower contact one another along an interface;

for each layer of the multi-material 3D part that utilizes less the N print heads, reassigning the assigned subdivision within the purge tower of an inactive print head in a layer to a print head that is active in the layer of the multi-material 3D part;

printing the subdivisions of each layer of the purge tower with the assigned or reassigned print heats to bring each print head utilized to print a portion of a layer or a layer of the multi-material part from a standby condition to a printing condition;

printing portions of the layer or the layer of the multi-material 3D part with the print head in the printing condition; and repeating the printing of each layer of the purge tower with the assigned and reassigned print heads for each subdivision of the purge tower and the layer of the multi-material part until the multi material part is printed.

2. The method of claim 1, wherein the one or more toolpaths do not intersect or overlap any other toolpath and do not intersect or overlap themselves.

3. The method of claim 1, wherein the subdivisions form vertical walls of the multi-node purge tower.

4. The method of claim 1, wherein the purge tower has a decreasing cross-section.

5. The method of claim 1, wherein the multi-node configuration comprises a center where all of the subdivisions conjoin.

6. The method of claim 5, wherein N equals 4 and the multi-node configuration comprises a bow tie.

7. The method of claim 5, wherein the multi-node configuration is a flower having N petals.

8. The method of claim 1, wherein N equals 4.

9. The method of claim 8, wherein the number of materials in at least one layer of the multi-node purge tower comprises two or more part materials and a support material.

10. A method of printing a multi-material part in a layer-wise manner with an extrusion-based 3D printer, the method comprising:

providing a sliced digital model of a multi-material 3D part identifying a number of print heads (N) needed to print the part on the extrusion-based 3D printer;

determining a number of materials in each of the slices of the digital model;

determining the maximum number of materials (M) in a single slice, wherein M is less than or equal to N;

utilizing a digital model of a purge tower having a multi-node configuration comprising M subdivisions each having a closed geometry, each adjacent subdivision contact one another along an interface;

assigning each print head required to print the multi-material 3D part to one subdivision and to one or more toolpaths forming the one subdivision in each layer, wherein portions of the one or more toolpaths of adjacent subdivisions of the purge tower are proximate each other;

for each layer of the multi-material 3D part that utilizes less the M print heads, reassigning the assigned subdivision within the purge tower of an inactive print head in a layer to a print head that is active in the layer of the multi-material 3D part;

printing the subdivisions of each layer of the purge tower with the assigned or reassigned print heats to bring each print head utilized to print a portion of a layer or a layer of the multi-material part from a standby condition to a printing condition;

printing portions of the layer or the layer of the multi-material 3D part with the print head in the operating condition; and repeating the printing of each layer of the purge tower with the assigned and reassigned print heads for each subdivision of the purge tower and the layer of the multi-material part until the multi material part is printed.

11. The method of claim 10, wherein the multi-node configuration comprises a bow tie, flower petal, circle, square, rectangle, ellipse and a cross.

12. The method of claim 10, wherein the M subdivisions in the layers of the multi-node purge tower are stacked and comprise a defined geometry with similarity or congruity.

13. The method of claim 10, wherein the M subdivision configuration comprises a center point where all of the subdivisions conjoin.

14. The method of claim 10, wherein the one or more toolpaths of the M subdivisions do not intersect or overlap.

15. The method of claim 10, wherein the number of materials in at least one layer of the multi-node purge tower comprises two or more part materials.

16. A computer program product comprising non-transitory computer executable code embodied in a non-transitory computer readable medium that, when executing on one or more computing devices, performs the steps of:

generating layerwise instructions for 3D printing a multi-node purge tower having a multi-subdivision configuration in coordination with 3D printing a multi-material part from three or more material extrusion print heads in a 3D printer wherein the multi-node purge tower configuration comprises a center point where multi-subdivisions conjoin in each layer along an interface of adjacent subdivisions of the multi-node purge tower;

causing subdivisions of the layers of the multi-node purge tower to be printed using print heads required to print a corresponding layer of the multi-material part wherein the print heads are brought to a printing condition from a stand-by condition to an operating condition; and after the print heads are brought to the printing condition, causing a multi-material part to be printed in a layer-wise manner wherein the multi-material part is printed from three or more materials, inclusive of support materials, which may be dissimilar material types or formulations, different colors of the same material type, different fillers in materials of the same type, combinations thereof, or the like.

17. The computer program product of claim 16, wherein the number of subdivisions per layer is equal to the number of materials used to print the multi-material part.

18. The computer program product of claim 16, wherein the number of subdivisions in the multi-node purge tower is equal to the maximum number of materials used for printing a layer of the multi-material part.

19. The computer program product of claim 16, wherein the subdivisions between layers of the multi-node purge tower are stacked and are congruent or similar in size.

20. The computer program product of claim 16, wherein the three or more materials comprise three part materials and a support material.

* * * * *